US011463313B2

(12) United States Patent
Zhang et al.

(10) Patent No.: US 11,463,313 B2
(45) Date of Patent: Oct. 4, 2022

(54) TOPOLOGY-AWARE CONTROLLER ASSOCIATIONS IN SOFTWARE-DEFINED NETWORKS

(71) Applicant: Futurewei Technologies, Inc., Plano, TX (US)

(72) Inventors: Jingjing Zhang, Plano, TX (US); Wei Wei, Plano, TX (US); Liurong Qian, Plano, TX (US)

(73) Assignee: Futurewei Technologies, Inc., Addison, TX (US)

( * ) Notice: Subject to any disclaimer, the term of this patent is extended or adjusted under 35 U.S.C. 154(b) by 0 days.

(21) Appl. No.: 16/865,823

(22) Filed: May 4, 2020

(65) Prior Publication Data
US 2020/0336379 A1 Oct. 22, 2020

Related U.S. Application Data

(63) Continuation of application No. 15/712,886, filed on Sep. 22, 2017, now Pat. No. 10,771,336.

(51) Int. Cl.
*G06F 15/16* (2006.01)
*G06F 9/54* (2006.01)
(Continued)

(52) U.S. Cl.
CPC ...... *H04L 41/0893* (2013.01); *H04L 41/0816* (2013.01); *H04L 41/12* (2013.01);
(Continued)

(58) Field of Classification Search
CPC . H04L 41/0893; H04L 41/0816; H04L 41/12; H04L 45/64; H04L 47/12; H04L 45/04; H04L 45/42
(Continued)

(56) References Cited

U.S. PATENT DOCUMENTS 6,584,499 B1   6/2003   Jantz et al.
6,614,764 B1   9/2003   Rodeheffer et al.
(Continued)

FOREIGN PATENT DOCUMENTS

CN   103414644 A   11/2013
CN   103944828 A    7/2014
(Continued)

OTHER PUBLICATIONS

Zhang, et al, "Modeling Access Networks as Trees in Software-Defined Network Controllers", filed Oct. 3, 2017, U.S. Appl. No. 15/725,035, 48 Pages.
(Continued)

*Primary Examiner* — Hamza N Algibhah
(74) *Attorney, Agent, or Firm* — James Anderson Harrison

(57) ABSTRACT

Control plane management based on physical topology of nodes in software-defined networks (SDNs) is provided. Nodes in an SDN are organized into a plurality of node clusters. A cluster of nodes in an SDN is formed and control plane management for the nodes within the cluster is provided. A topology-aware assignment of nodes to controllers in an SDN is provided. Related nodes such as root and corresponding child nodes are assigned to a single cluster in one embodiment to lessen the impacts of controller failure. The assignment of nodes to controllers is also provided based on minimizing traffic between node clusters and between nodes and external networks.

10 Claims, 16 Drawing Sheets

(51) Int. Cl.
*H04L 29/06* (2006.01)
*H04L 41/0893* (2022.01)
*H04L 45/64* (2022.01)
*H04L 41/0816* (2022.01)
*H04L 41/12* (2022.01)
*H04L 47/12* (2022.01)
*H04L 45/02* (2022.01)
*H04L 45/42* (2022.01)

(52) U.S. Cl.
CPC .............. *H04L 45/64* (2013.01); *H04L 47/12* (2013.01); *H04L 45/04* (2013.01); *H04L 45/42* (2013.01)

(58) Field of Classification Search
USPC ........................................................ 709/221
See application file for complete search history.

(56) References Cited

U.S. PATENT DOCUMENTS

| | | | |
|---|---|---|---|
| 6,760,324 | B1 | 7/2004 | Jantz et al. |
| 7,983,207 | B2 | 7/2011 | Lai et al. |
| 8,000,267 | B2 | 8/2011 | Solis et al. |
| 2002/0101875 | A1 | 8/2002 | Lui et al. |
| 2003/0140165 | A1 | 7/2003 | Chiu et al. |
| 2003/0193959 | A1 | 10/2003 | Lui et al. |
| 2004/0160907 | A1 | 8/2004 | Perlman |
| 2014/0325038 | A1* | 10/2014 | Kis ................. H04L 41/0803 709/220 |
| 2015/0043576 | A1* | 2/2015 | Dixon ................ H04L 12/184 370/390 |
| 2015/0088827 | A1* | 3/2015 | Xu ....................... G06F 3/0605 707/634 |
| 2015/0103844 | A1 | 4/2015 | Zhao et al. |
| 2015/0188837 | A1 | 7/2015 | Djukic et al. |
| 2016/0050104 | A1* | 2/2016 | Wackerly ............ H04L 41/12 370/220 |
| 2016/0135111 | A1 | 5/2016 | Huang et al. |
| 2016/0218917 | A1* | 7/2016 | Zhang ................ H04L 49/35 |
| 2016/0226701 | A1 | 8/2016 | Luo et al. |
| 2016/0277959 | A1 | 9/2016 | Venkataraman et al. |
| 2016/0380807 | A1 | 12/2016 | Shevenell et al. |
| 2017/0026294 | A1* | 1/2017 | Basavaraja .......... H04L 45/745 |
| 2017/0099156 | A1* | 4/2017 | Qiu ........................ H04L 12/18 |
| 2017/0237605 | A1* | 8/2017 | Koponen ............ H04L 41/0873 370/216 |
| 2017/0289020 | A1 | 10/2017 | Zhao |
| 2018/0167307 | A1 | 6/2018 | Barry et al. |
| 2018/0307522 | A1* | 10/2018 | Wu ..................... H04L 41/0886 |
| 2018/0324093 | A1 | 11/2018 | Namjoshi et al. |
| 2019/0028577 | A1* | 1/2019 | D?Souza ................ H04L 69/40 |

FOREIGN PATENT DOCUMENTS

| | | |
|---|---|---|
| CN | 104618130 A | 5/2015 |
| CN | 104753709 A | 7/2015 |
| CN | 105721170 A | 6/2016 |
| CN | 105900403 A | 8/2016 |
| CN | 106953744 A | 7/2017 |
| WO | 2015105987 A1 | 7/2015 |

OTHER PUBLICATIONS

Zhang, et al, "Controller Communications in Access Networks", filed Oct. 3, 2017, U.S Appl. No. 15/724,080, 41 Pages.
Berde et al., ONOS: Towards and Open, Distributed SDN OS, HotSDN'14, Aug. 22, 2014, 6 Pages.
Hock et al., Pareto-Optimal Resilient Controller Placement in SDN-based Core Networks, 25th International Feletraffic Congress (ITC), 2013, 9 Pages.
Muller et al., Survivor: an Enhanced Controller Placement Strategy for Improving SDN Survivability, Globecom, 2014, 7 Pages.
Panda et al., SCL: Simplifying Distributed SDN Control Planes, 14th USENIX Symposium on Networked Systems Design and Implementation (NSDI' 17), Mar. 27-29, 2017, 19 Pages.
International Search Report dated Dec. 13, 2018 in PCT Application No. PCT/CN2018/106942, 10 pages.
Office Action dated Feb. 26, 2019, in U.S. Appl. No. 15/724,080.
Office Action dated Mar. 8, 2019, in U.S. Appl. No. 15/725,035.
Response to Office Action filed Jun. 26, 2018, in U.S. Appl. No. 15/724,080.
Notice of Allowance dated Aug. 9, 2019, in U.S. Appl. No. 15/724,080.
Notice of Allowance dated Sep. 18, 2019, in U.S. Appl. No. 15/725,035.

* cited by examiner

TOPOLOGY-AWARE CONTROLLER ASSOCIATIONS IN SOFTWARE-DEFINED NETWORKS

CROSS-REFERENCE TO RELATED APPLICATIONS

This application is a continuation of and claims the benefit of priority to U.S. application Ser. No. 15/712,886, filed Sep. 22, 2017, and entitled "Topology-Aware Controller Associations in Software-Defined Networks", which applications is hereby incorporated by reference.

BACKGROUND OF THE INVENTION

Data networks include network nodes, such as routers, switches, bridges, and other devices that transport data through the network. Software defined networks (SDN) include network technology that provides customization and optimization not often available with traditional network management. Networks, such as data center networks, enterprise networks, and carrier networks, may include one or more SDNs.

An SDN simplifies modern networks by decoupling the data-forwarding capability (e.g. a data plane) from routing, resource, and other management functionality (e.g. a control plane) previously performed in the network nodes. Network nodes that support software-defined networking may be configured to implement the data plane functions, while the control plane functions may be provided by an SDN controller. Open application programming interface (API) services, such as the OpenFlow protocol, may manage the interactions between the data plane and control plane and allow for the implementation of non-vendor specific combinations of networking nodes and SDN controllers within a network. As a result, software-defined networking in conjunction with an Open API service may provide numerous benefits to modern networks that include increased network virtualization, flexible control and utilization of the network, and customization of networks with specific requirements.

While SDNs provide many advantages over traditional network management options, they can also present challenges. An SDN controller typically controls and manages control plane functions for many distributed network nodes. Each node may have a particular set of devices, connections to other nodes in the network, and control and management capabilities.

SUMMARY

According to one aspect of the present disclosure, there is provided a system, comprising: one or more networks comprising a plurality of nodes and a plurality of links between a subset of the nodes, each node is associated with at least one device; a plurality of controllers configured to manage control plane functions for the one or more networks; and one or more servers, coupled to the one or more networks and the plurality of controllers, including a computer-readable medium storing instructions that when executed by one or more processors, cause the one or more processors to: determine a first parent node that is isolated from a second parent node in the one or more networks; create from the plurality of nodes a first node cluster including the first parent node and one or more first child nodes having one or more links to the first parent node; create from the plurality of nodes a second node cluster including the second parent node and one or more second child nodes having one or more links to the second parent node, wherein nodes of the second node cluster are isolated from nodes of the first node cluster; and configure the first node cluster for control by a first controller of the plurality and the second node cluster for control by a second controller of the plurality.

Optionally, in any of the preceding aspects, the one or more processors execute the instructions to: create the plurality of first and second node clusters based on minimizing a total amount of traffic connecting nodes within each of the first and second node clusters to the one or more networks; and assign nodes to each node cluster in accordance with a minimal total traffic determination.

Optionally, in any of the preceding aspects, each of the first and second node clusters includes nodes of the plurality that are isolated from other nodes of other node clusters.

Optionally, in any of the preceding aspects, a corresponding subset of nodes for each of the first and second node clusters includes at least one parent node and a group of child nodes having a data path through the at least one parent node; the at least one parent node of each node cluster is isolated from the at least one parent node of each other node cluster; and each controller controls the at least one parent node and each group of child nodes for the first or second node cluster corresponding to the controller.

Optionally, in any of the preceding aspects, the one or more processors execute the instructions to: create the plurality of node clusters based on assigning each child node corresponding to a parent node to the same node cluster as the parent node.

Optionally, in any of the preceding aspects, the one or more processors create the plurality of node clusters based on minimizing a sum of a set of weights representing the total amount of traffic between each of the first and second node clusters and the one or more networks.

Optionally, in any of the preceding aspects, the total amount of traffic between each of the first and second node clusters and the one or more networks includes: a sum of upstream traffic between nodes of different clusters; and a sum of downstream traffic between nodes of different clusters.

Optionally, in any of the preceding aspects, minimizing the sum of the set of weights includes applying a larger weighting to the upstream traffic.

Optionally, in any of the preceding aspects, configuring the first node cluster for control by a first controller of the plurality includes configuring a control link between the first controller and each node of the first node cluster; and configuring the second node cluster for control by a second controller of the plurality includes configuring a control link between the second controller and each node of the second node cluster.

Optionally, in any of the preceding aspects, the one or more processors execute the instructions to: identify a first node associated with a line terminal device having a plurality of ports; assign a first port of the line terminal device to a third controller; and assign a second port of the line terminal device to a fourth controller.

Optionally, in any of the preceding aspects, the one or more networks are one or more software-defined access networks.

According to one aspect of the present disclosure, there is provided a computer-implemented method for network management, comprising: accessing, by one or more processors, network information for a plurality of nodes, each node associated with at least one device; creating, by the one or more processors, a plurality of node clusters based on minimizing a total amount of traffic connecting nodes within each node cluster to one or more networks; assigning, by the one or more processors, each of the plurality of nodes to one of the plurality of node clusters in accordance with a minimal total traffic determination; configuring, by the one or more processors, each of a plurality of controllers for control of a subset of nodes associated with one or more of the node clusters.

Optionally, in any of the preceding aspects, each node cluster includes a subset of nodes of the plurality that is isolated from other nodes of other node clusters.

Optionally, in any of the preceding aspects, the subset of nodes for each node cluster includes at least one parent node and a corresponding group of child nodes having a data path through the at least one parent node; the at least one parent node of each node cluster is isolated from the at least one parent node of each other node cluster; and each controller is configured to control the at least one parent node and each group of child nodes for a corresponding node cluster.

Optionally, in any of the preceding aspects, the method further comprising creating the plurality of node clusters based on assigning each child node corresponding to a parent node to the same node cluster as the parent node.

Optionally, in any of the preceding aspects, creating a plurality of node clusters includes minimizing a sum of a set of weights representing the total amount of traffic between each node cluster and the one or more networks.

Optionally, in any of the preceding aspects, the total amount of traffic between each node cluster and the one or more networks includes: a sum of upstream traffic between nodes of different clusters; and a sum of downstream traffic between nodes of different clusters.

Optionally, in any of the preceding aspects, configuring each controller for control of a subset of nodes associated with one or more of the node clusters includes creating a control link between the controller and each node of a corresponding cluster.

According to one aspect of the present disclosure, there is provided a non-transitory computer-readable medium storing computer instructions for network management, that when executed by one or more processors, cause the one or more processors to perform the steps of: access network information for a plurality of nodes, each node associated with at least one device; assign to each node a weight representing a total amount of traffic associated with the node; determine that a first combined weight of a first node and a second node is less than a capacity of a first controller, the second node is a parent to the first node; in response to determining that the first combined weight is less than the capacity, determine that a second combined weight of the first node, the second node, and a third node is less than the capacity, the third node is a child to the second node; in response to determining that the second combined weight is less than the capacity, determine that a third combined weight of the first node, the second node, the third node, and a fourth node is equal to or greater than the capacity, the fourth node is a parent to the second node; in response to determining that the third combined weight is equal to or greater than the capacity, assign the first node, the second node, and the third node to the first controller and assigning the fourth node to a second controller.

Optionally, in any of the preceding aspects, the instructions cause the one or more processors to: create a plurality of node clusters based on minimizing a total amount of traffic connecting nodes within each node cluster to one or more networks; and assign the first node, the second node, and the third node to a first node cluster and assign the fourth node to a second node cluster in accordance with a minimal total traffic determination.

Optionally, in any of the preceding aspects, a corresponding subset of nodes for each node cluster includes at least one parent node and a group of child nodes having a data path through the at least one parent node; the at least one parent node of each node cluster is isolated from the at least one parent node of each other node cluster; and each controller is configured to control the at least one parent node and each group of child nodes for a node cluster corresponding to the controller.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

DETAILED DESCRIPTION

Figure 1:
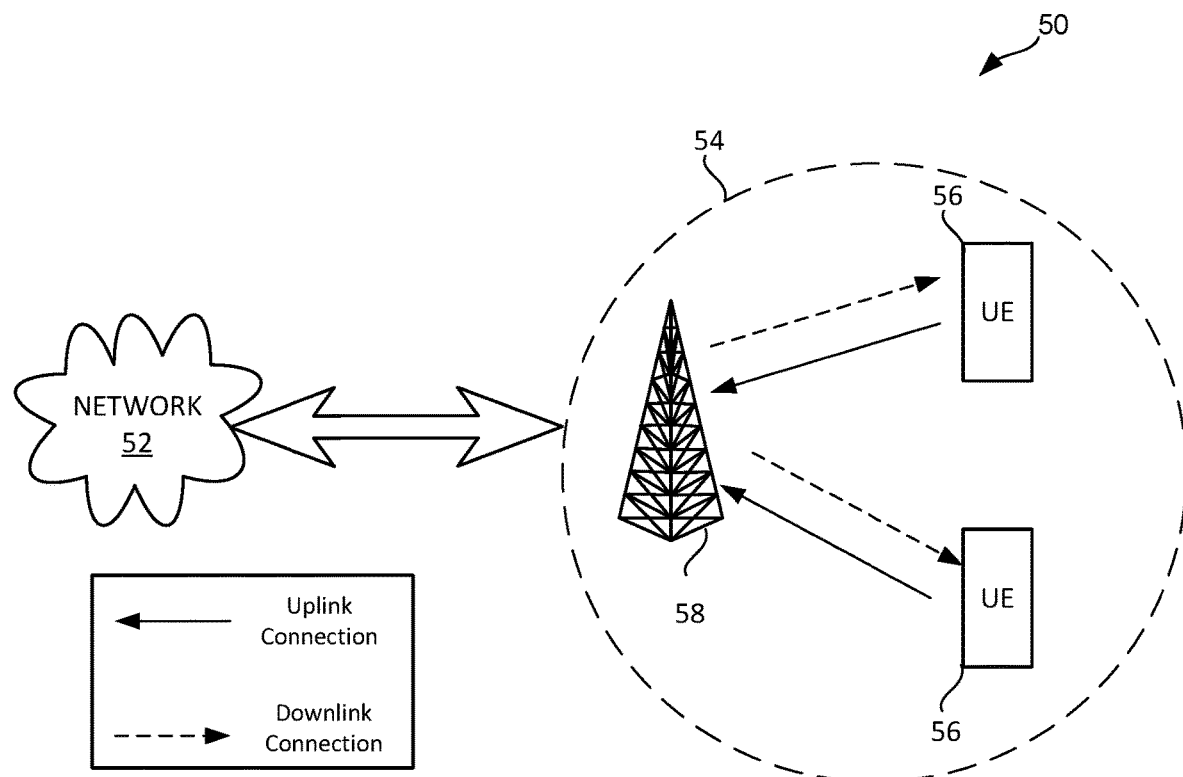
FIG. 1 illustrates a network environment for communicating data.

The disclosed technology relates to software-defined networks (SDNs), and more particularly to network configurations for SDNs including multiple network nodes and multiple controllers. SDNs typically include a plurality of nodes and a plurality of links between some of the nodes.

For example, a software-defined access network may provide connectivity between a plurality of user equipments (e.g., client devices) and one or more external networks.

In one embodiment, an SDN having a plurality of nodes is configured for control by multiple controllers. The nodes are organized into node clusters, also referred to as partitions, with each node cluster being assigned to one of the controllers. The node clusters are formed based on the physical topology of the SDN. Nodes that are related are determined based on the topology of the network. The nodes are then grouped based on their relations to other nodes in the topology. In one embodiment, the nodes are grouped so as to minimize downtime if a controller and/or a node in the SDN fails. For example, each parent node and its corresponding child nodes in the SDN may be assigned to the same controller. In this manner, failure of the controller only is more likely to affect a single tree structure in the SDN, rather than multiple tree structures as may result if a controller for multiple parent nodes fails.

In one embodiment, a server accesses network information that describes an SDN. The network information may be accessed by receiving network information from nodes in the SDN, by polling nodes in the SDN, or by reading preexisting network information. Network information may include traffic information related to the nodes of the network, physical topology information, and/or other information relating to nodes in the SDN. A network configuration such as a software-defined description for the SDN may be accessed or generated to determine topology information in one example. The server accesses node information to determine parent (e.g., root) nodes that are isolated from other parent nodes. For example, the server may determine that a node is a root node if it does not have any upstream nodes through which data flows to reach the node. The controller then determines any nodes associated with each root node. For example, the controller may determine any child nodes downstream to the root node. A child node may be any node for which data has to travel through the root node to reach the child node. The controller creates node clusters that each include a root node and any child node associated with the root node. Each node cluster is then assigned to a single one of the controllers for the SDN. One or more node clusters may be assigned to each controller.

In one embodiment, the server further analyzes traffic information relating to potential node clusters in order to determine how to partition the nodes of the SDN. The server may create the plurality of node clusters based on minimizing a total amount of traffic that connects nodes within each cluster to one or more networks. The total amount of traffic may be between each node cluster and external networks and/or the SDN itself. For example, a total amount of traffic can be determined based on a sum of upstream and downstream traffic between nodes of different clusters. In one embodiment, the server uses a graph-partition algorithm having multiple constraints to select a partitioning of nodes into clusters for an SDN based on minimizing the traffic. For example, the server may create the clusters based on minimizing a sum of a set of weights that represent the total amount of traffic between each node cluster and the one or more networks.

In one embodiment, the disclosed technology may be used to configure ports on devices at nodes with an SDN. For example, an optical line terminal may cover a large number of nodes. The large number of nodes may not be optimal for control by a single controller. For example, a controller may not be capable of handling all requests from the nodes of the terminal. In one embodiment, individual ports of a single optical line terminal may be assigned to different controllers for control plane management.

In one embodiment, the disclosed technology includes a network model that models the nodes in a network as a tree. In a tree topology, a subset of connected nodes is modeled as a branch of a tree which has no edges to connect the subset of nodes to the nodes of other branches of the tree. In this manner, the branches of the tree may not directly communicate. This tree structure, which accurately describes networks such as access networks, is simpler to describe than a general graph.

FIG. 1 illustrates a network environment 50 for communicating data. Network 50 includes a base station 58 including one or more antennas having a coverage area 54. Base station (BS) 58 may include a communications controller. Network environment 50 includes a plurality of user equipments (UEs) 56, and a network 52 such as a backhaul network. Two UEs are depicted, but many more may be present. A communications controller at base station 58 may be any component capable of providing wireless access by, inter alia, establishing uplink (dashed line) and/or downlink (dotted line) connections with UEs 56. Base station 58 may include an enhanced base station (eNB), a picocell, a femtocell, and other wirelessly enabled devices. UEs 56 may be any component capable of establishing a wireless connection with BS 58, such as cell phones, smart phones, tablets, sensors, etc. Network 52 may be any component or collection of components that allow data to be exchanged between BS 58 and a remote end (not shown). In some embodiments, the network 52 may comprise various other wireless devices, such as relays, femtocells, etc.

Figure 2:
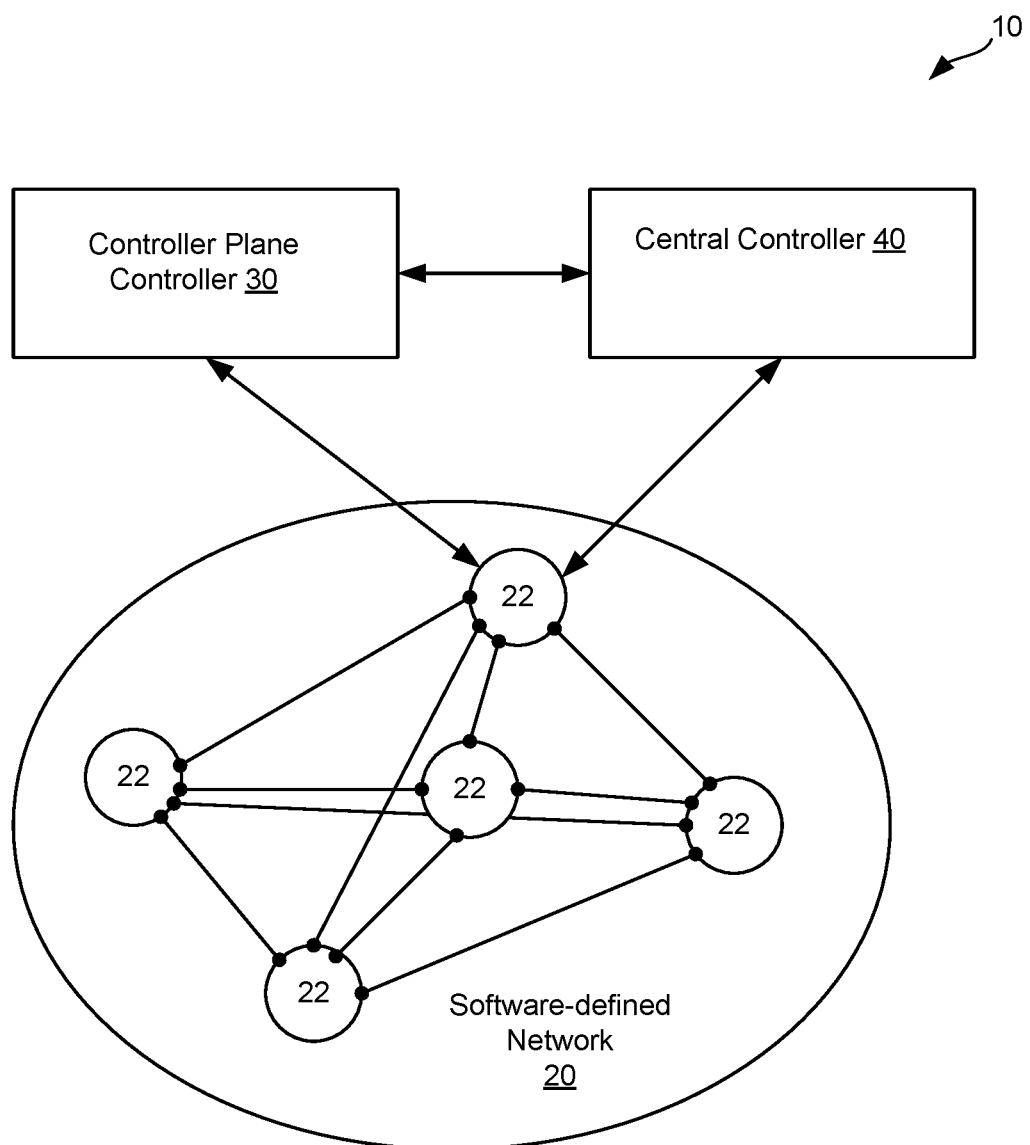
FIG. 2 is a block diagram of an example of a network environment.

FIG. 2 is a block diagram of an example of a network environment 100 in which embodiments of the disclosed technology may be practiced. The network environment comprises a software-defined network (SDN) 20, at least one control plane controller 30, and at least one central controller 40. The SDN 20, the control plane controller 30, and the central controller 40 communicate with each other via optical, electrical, or wireless means. Although controller 30 is shown separate from SDN 20, controller 30 may be implemented in the SDN 20 at one of nodes 22, for example. Controller 30 may be implemented in a server or other computing device at one of nodes 22, or a computing device remote from SDN 20.

In one embodiment, SDN 20 can be implemented as an access network that provides connectivity between user equipment 56 and network 52. For example, SDN 20 may include a plurality of network nodes that provide multiple configurable data paths to provide connections between user equipment 56 and network 52.

In one embodiment, the SDN 20 is a packet switched network, where data traffic is transported using packets or frames along network paths or routes. The packets may be routed or switched along a traffic engineered label switched paths established by a signaling protocol, such as multiprotocol switching (MPLS) or Generalized MPLS (GMPLS), based on a path computed by the controller 30 and/or developed by the nodes 22. The SDN 20 comprises a plurality of nodes 22 coupled to one another using optical, electrical, or wireless links. The SDN 110 may also comprise a plurality of domains, such as autonomous system (AS) domains or IGP areas, which may each comprise a set of network elements corresponding to the same address management and/or path computational responsibility. The domains are organized via physical mechanisms (e.g. location, connections, etc.) and/or logical means mechanisms (e.g. network topology, protocols, communication layers, etc.). The different domains are coupled to each other and each comprises some of the nodes 22.

Nodes 22 are any devices or components that support transportation of the packets through the SDN 20. For example, the nodes 22 may include bridges, switches, routers, or various combinations of such devices. The nodes 22 may include a plurality of ingress ports for receiving packets from other nodes 22, logic circuitry that determines which nodes 22 to send the frames to, and a plurality of egress ports for transmitting frames to the other nodes 22. In some embodiments, at least some of the nodes 22 are label switched routers (LSRs), which are configured to modify or update the labels of the packets transported in the label switched network 20. In some embodiments, some of the nodes 22 are label edge routers (LERs). For example, the nodes 22 at the edges of the SDN 20 are configured to insert or remove the labels of the packets transported between the label switched network 110 and external networks. The first node 22 and the last node 22 along a path are sometimes referred to as the source node or head end node and the destination node or tail end node, respectively. Although four nodes 22 are shown in the SDN 20, the SDN 20 may comprise any quantity of nodes 22. Additionally, the nodes 22 may be located in different domains in the SDN 20 and may be configured to communicate across multiple domains. For example, the nodes 22 that correspond to different domains may exchange packets along a path that is established across multiple domains.

The control plane controller 30 is any device configured to coordinate activities within the SDN 20. Controller 30 may include a Network Management System (NMS) or Operations Support System (OSS). Specifically, the control plane controller 30 receives routing requests from the SDN 30 and returns the corresponding path information. The control plane controller 30 may perform path computation and forward the computed path to at least one of the nodes 22. The control plane controller 30 may be located in a component outside of the SDN 30, such as an external server, or may be located in a component within the SDN 110, such as in a server at a node 22.

The central controller 40 is any device configured to coordinate activities by the control plane controllers 30, for example where multiple control plane controllers are used to manage control plane functions within the SDN 20. The central controller 40 may be located in a component outside of the SDN 20, such as an external server, or may be located in a component within the SDN 20, such as in a server at a node 22. In one embodiment, a central controller performs the processes described herein to generate a network configuration. The network configuration can be provided to one or more control plane controllers 30.

A controller may be operated based on the Openflow protocol. An SDN is a network technology that provides programmable central control of network traffic without requiring physical access to the network's devices. SDNs may employ Internet Protocol (IP) networks utilizing Transmission Control Protocol/Internet Protocol (TCP/IP). SDNs may decouple the data-forwarding capability, e.g., the data plane, from routing, resource, and other management functionality, e.g., the control plane, previously performed in the network nodes. Decoupling the control plane from the data plane of the network enables the network controller to efficiently control the network traffic through globally optimized traffic engineering and routing, which departs from locally optimized shortest path first. SDN may also simplify network operations or even have the capabilities to flatten the network with extended data routing vectors.

A controller may be designed that controls and manages an entire network such as an access network (e.g., including GPON—gigabit passive optical network, EPON—Ethernet passive optical network, G.Fas.). Examples of SDN controllers include ONOS (open network operating system) and ODL (Open Daylight). Controllers may utilize protocols including netconf, openflow, or private vendor protocols. In some examples, a hardware abstraction layer is provided between provide vendor devices and the SDN controller. Voltha is an example of a hardware abstraction layer that can be provided. In some examples, openflow and/or Netconf protocols may be used to communicate between a VOLTHA hardware abstraction layer and an ONOS or ODL controller.

The control plane controller may include or communicate with a path computation engine (PCE), not shown. A PCE is any device or component configured to perform all or part of the path computation for the SDN 20, e.g. based on a path computation request. The PCE can receive information for computing a path from the control plane controller 30, from the node 22, or both. The PCE processes the information to obtain the path. For instance, the PCE computes the path and determines the nodes 22 including the LSRs along the path. The PCE may then send all or part of the computed path information to the control plane controller 30 or directly to at least one node 112. Further, the PCE 130 is typically coupled to or comprises a traffic-engineering database (TED), a P2MP Path database (PDB), a P2P path database, an optical performance monitor (OPM), a physical layer constraint (PLC) information database, or combinations thereof, which may be used to compute the path. The PCE may be located in a component outside of the SDN 20, such as an external server, or may be located in a component within the SDN 20, such as at node 22. The PCE may be configured as part of the control plane controller 30. Alternately, the PCE may be configured as part of the central controller 40.

A path computation request is sent to the PCE by a requesting device. The requesting device is any client application requesting a path computation to be performed by the PCE. The requesting device may also be any network component that makes such a request, such as the control plane controller 30, or any node 22, such as a LSR. For instance, the requesting device may request from the PCE a P2MP path or P2P path in a single domain or across multiple domains in SDN 20. Additionally, the requesting device may send the PCE at least some of the path required information, for example via a path computation request and/or through broadcast signaling via link state advertisements (LSAs), etc.

Figure 3:
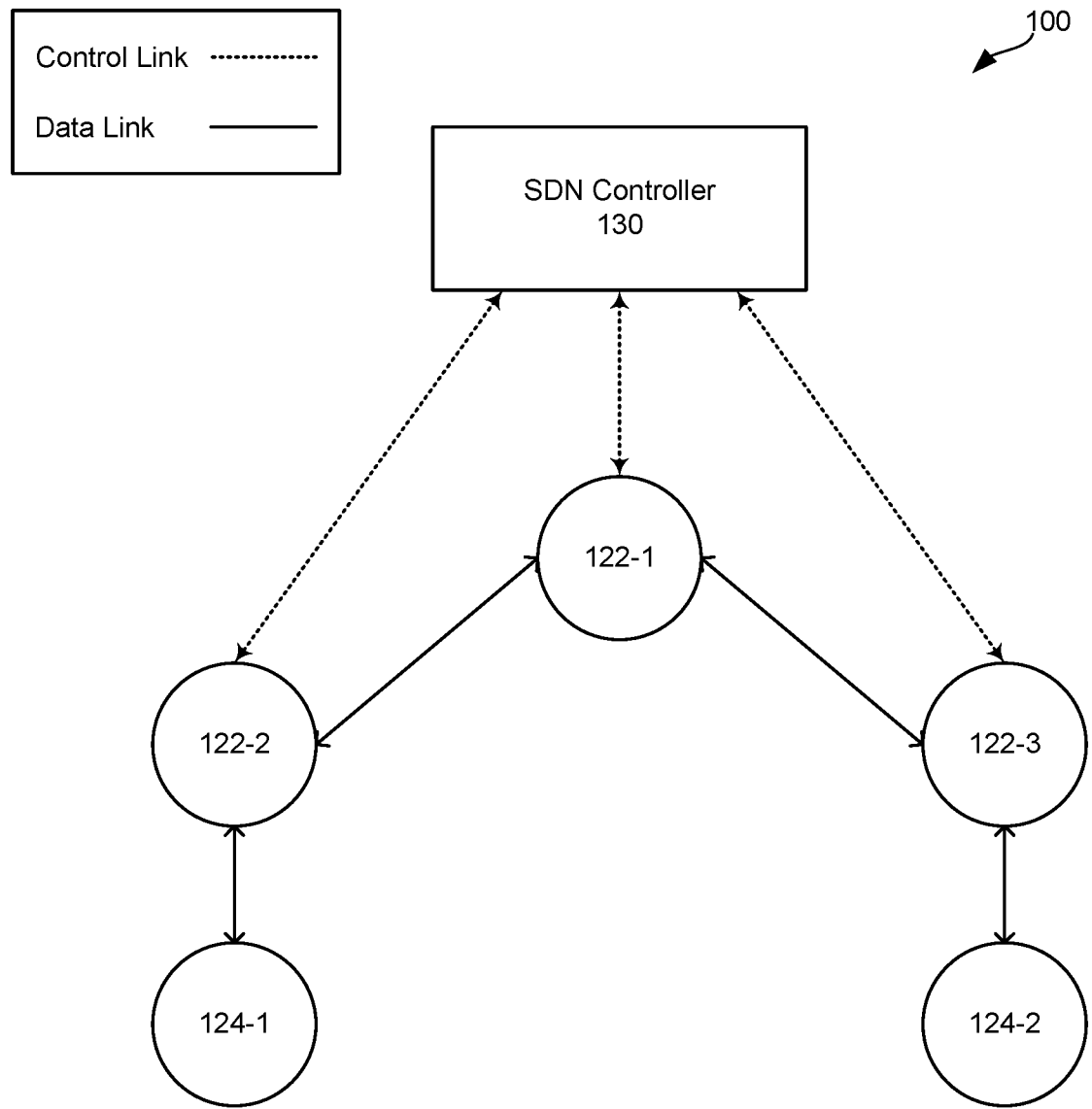
FIG. 3 is a schematic diagram of an example embodiment of a software-defined network (SDN) network.

FIG. 3 is a schematic diagram of an example embodiment of an SDN network 100. The network 100 comprises an SDN controller 130, a plurality of network nodes 122, and a plurality of end nodes 124. The network nodes 122 comprise switches, routers, bridges, and/or any other device that is used to receive and/or forward data in a network. The control path is represented by dashed lines and the data path is represented by solid lines. System configuration, management information, and routing/forwarding table information are exchanged between the network controller 130 and the network nodes 122 via the control path.

Data packets are received from end nodes 124 and forwarded between network nodes 122 via the data path. For example, data from end node 124-1 acting as a publisher are received at network node 122-2 acting as an Ingress Border Router (IBR), routed through network node 122-1 acting as a Transit Router (TR), and passed to end node 124-2 acting as a destination node using network node 122-3 acting as an Egress Border Router (EBR). A border router is a router on the edge of an SDN domain that is connected to at least one node outside of the SDN domain, the IBR is an SDN border router that receives traffic from outside of the SDN domain, and the EBR is an SDN border router that sends traffic outside of the SDN domain. The TR is an SDN router that transports traffic within the SDN domain and has no interfaces connected outside of the SDN domain. A single border router may function as an IBR, an EBR, or both, depending on traffic flow(s) transported through the LSPs. The end nodes 124 are any network elements configured to transmit, receive, originate, and/or terminate data, or, in alternate embodiments, other networks, e.g., IP networks, MPLS networks, etc. In some embodiments, the network controller 130 is a generalized network controller configured to control the network nodes 122 and end nodes 124. The network controller 130 is any device configured to perform control path and/or control plane functionality, such as creating a network map and defining the information in a routing table that defines how to route incoming packets. The network controller 130 is also configured for management and control functionality of the control plane, which includes routing and resource management. The network nodes 122 and end nodes 124 include devices that receive and transmit data through the network 200 according to a standard. At least some of the network nodes 122 and end nodes 124 and network controller 130 may conform to a standard, e.g. as defined by Open Networking Foundation (ONF) document OpenFlow Switch Specification version 1.3.4, ONF document Openflow Controller Switch NDM Synchronization version 1.0, and ONF document Software-Defined Networking: The New Norm for Networks, ONF Whitepaper (collectively Openflow).

Though not shown within FIG. 3, the controller 130 receives data from, and transmits messages to, the network nodes, which data and messages may be used to manage and control the network nodes (e.g., the controller can determine the network topology based on data received from the network nodes). Some of the incoming messages or parts of the incoming messages are translated into a standard independent format for processing by some of the modules in the network controller 130. The standard independent format is based on an abstract network control data model that provides an abstraction of the attributes or features of the various standard formats. The network controller 130 interacts with the network nodes via a variety of application programming interface (API) protocols, e.g., Openflow. The controller determines the global network topology of the network. With the global network topology, state information, dynamic traffic flow/volume information, and other network state information, the network controller makes decisions on how to assign resources and route applications, information, and/or data packet flows through the network.

Figure 4:
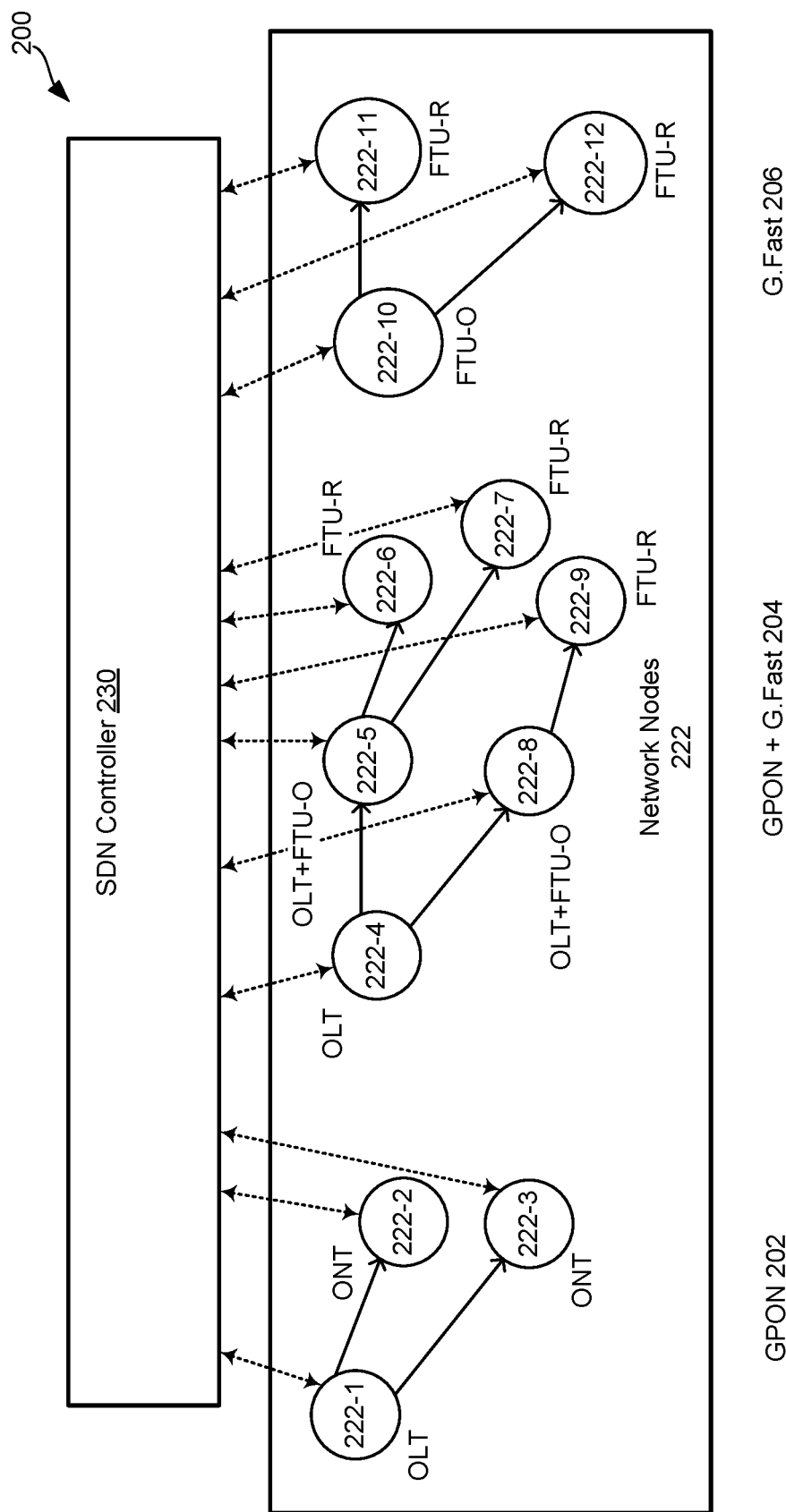
FIG. 4 is a block diagram of an example of a SDN.

FIG. 4 is a block diagram of another example of an SDN 200 including an SDN controller 230 and a plurality of network nodes. SDN 200 may be an access network in one example, with controller 230 designed to manage and control the entire access network. In the particularly described example, the access network includes a GPON (Gigabit Passive Optical Network) subnetwork 202, a GPON+G.Fast (digital subscriber line protocol standard) subnetwork 204, and a G.Fast network 206. The GPON subnetwork includes an optical line terminal node (OLT) 221-1 and two optical network terminal (ONT) nodes 222-2 and 222-3. The GPON+G.Fast network includes an OLT node 222-4, two intermediate OLT+FTU-O nodes 222-5 and 222-8, and three FTU-R nodes 222-6, 222-7, and 222-9. The G.Fast network includes an FTU-O node 222-10 and two FTU-R nodes 222-11.

Figure 5:
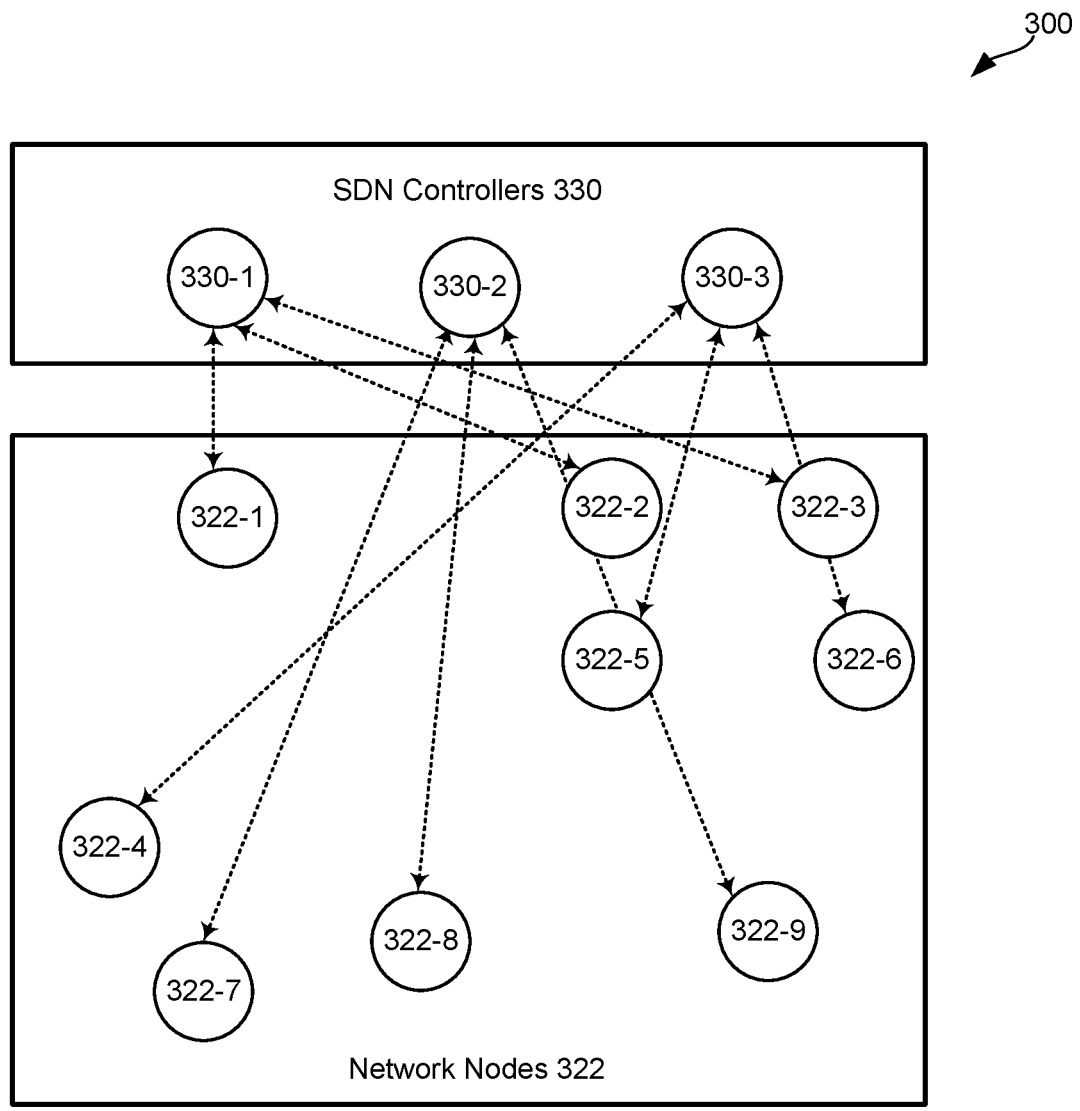
FIG. 5 is a block diagram of an example of a network environment including multiple controllers.

FIG. 5 is a block diagram of another example of a network environment 300 including multiple SDN controllers 330 for managing and controlling a plurality of network nodes 322. Multiple controllers may be used in implementations with a large number of network nodes to be managed, as well as to provide high availability. In FIG. 5, controller 330-1 includes control links with nodes 322-1, 322-2, and 322-3. Controller 330-2 includes control links with nodes 322-7, 322-8, and 322-9. Controller 330-3 includes control links with nodes 322-4, 322-5, and 322-6.

In this manner, the nodes are divided into three node partitions, also referred to as node clusters, with each partition including three network nodes. Similarly, the three controllers may be said to form a controller cluster for all of the network nodes. The use of multiple controllers may provide high availability by providing the capability of one controller to take over for another in the event of failure. Nodes 322-1, 322-3, and 322-3 form a node cluster controlled by controller 330-1. Nodes 322-7, 322-8, and 322-9 form a node cluster controller by controller 330-2, and nodes 322-4, 322-5, and 322-6 form a node cluster controller by controller 330-3.

In one embodiment, a node or device at a node only communicates with a single master controller. The node may have connections to other controllers, but only communicates with the master controller at a given point in time. If however, the master controller for the node fails, another controller connected to the node may take over control plane functions for the nodes controlled by the failed controller. For example, in response to an event indicating that controller 330-1 has failed, control of nodes 322-1, 322-2, and 322-3 may shift to controller 330-2.

Figure 6:
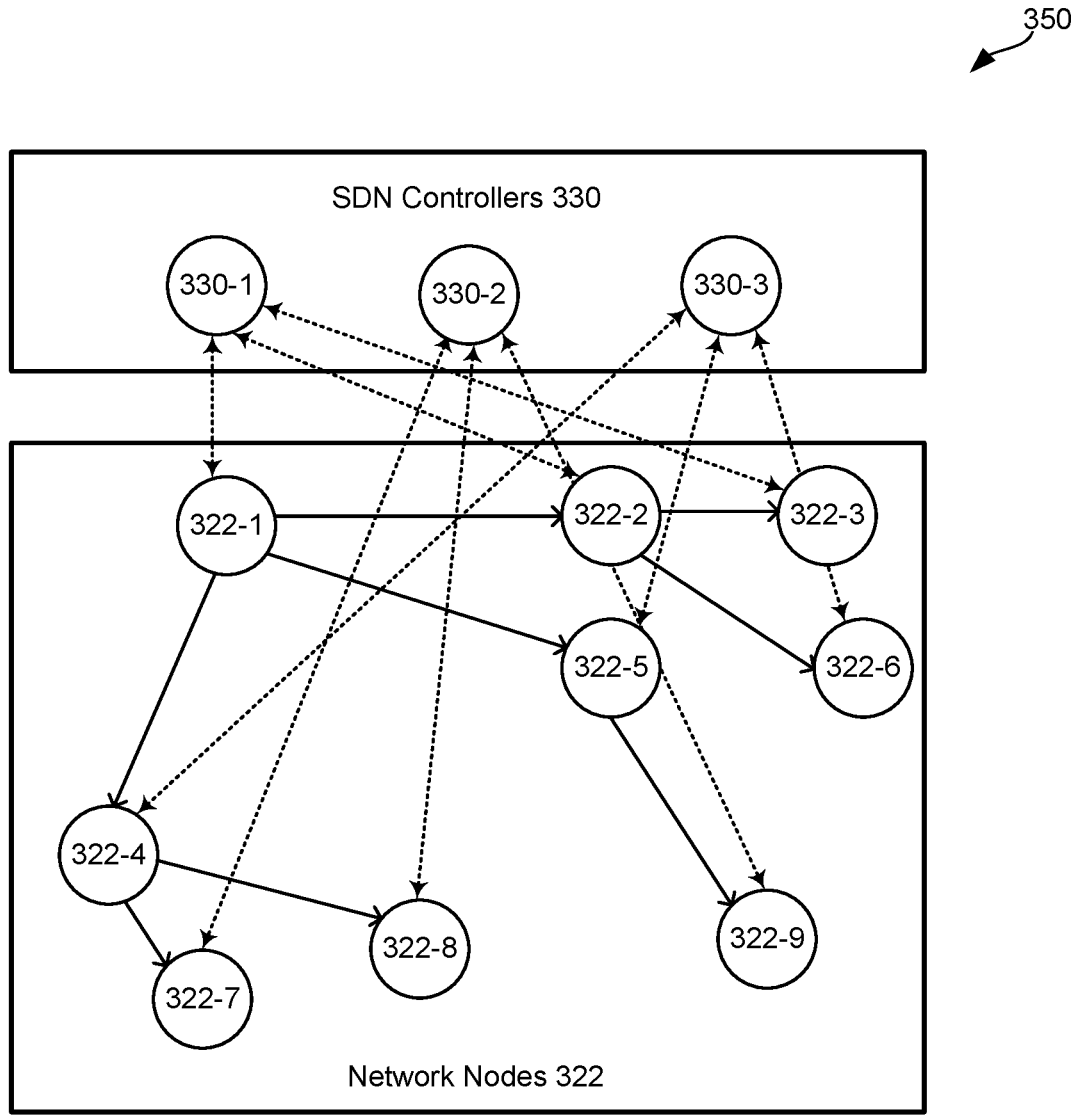
FIG. 6 is a block diagram of an example of a network environment including nodes in a tree topology.

FIG. 6 is a block diagram of a network environment 350, continuing with the example the network nodes 322 shown in FIG. 5. In FIG. 6, the physical topology including connecting links between the intermediate nodes of the access network is shown. An examination of the node and link structure reveals a common attribute of access networks, namely a tree topology having at least one root node through which data for one or more downstream nodes passes.

In FIG. 6, node 322-1 is a root node for each of the other nodes. A tree topology is formed with root node 322-1 and the downstream nodes. FIG. 6 has five individual connecting paths originating at root node 322-1. A first branch of the tree includes downstream nodes 322-2 and 322-3. A second branch of the tree includes downstream nodes 322-2 and 322-6. A third branch of the tree includes downstream nodes 322-5 and 322-9. A fourth branch of the tree includes downstream nodes 322-4 and 322-7. A fifth branch of the tree includes downstream nodes 322-4 and 322-8.

In a tree topology as illustrated, the full set of nodes is not interconnected as in many architectures, such as the mesh architecture shown in FIG. 1. With a tree topology, an access network can distribute user traffic from a root node of the tree down to the leaf or end nodes. The root node can be considered the base of the tree, with connections that branch out in a tree-like manner to additional nodes, including intermediate nodes and culminating with leaf nodes at the top of the tree. Similarly, the access network can aggregate user traffic from the leaf nodes at a root node. The root node may connect the leaf nodes to a service provider. The root node may be connected to a server at the service provider or to an external network.

The branches do not have connecting edges and thus, do not communicate directly. Instead, the branches communicate through one or more intermediate connecting nodes. For example, the leaf nodes in each branch have no direct connecting links. Accordingly, communication between the a leaf node and the root node must pass through an intermediate node.

Traditionally, network configurations have not considered the tree topology of a network in making controller assignments for nodes in an SDN. Moreover, the traffic implications of different controller assignments have not been considered. As a consequence, optimization of uptime in SDNs has not been achieved.

Consider the controller assignments in FIG. 6, for example. The failure of different nodes in the SDN will have different impacts on the overall SDN. For example, node 322-1 is a root node to all other nodes in the SDN. If root node 322-1 fails, communication to all other nodes in the SDN fails. Similarly, if controller 330-1 which controls root node 322-1 fails, all of the communications in the SDN fail. If, however, leaf nodes 322-7, 322-8, or 322-9 fail only communication to those nodes will fail. Similarly, if controller 330-2 fails only communication to leaf nodes 322-7, 322-8, or 322-9 will fail.

Figure 7:
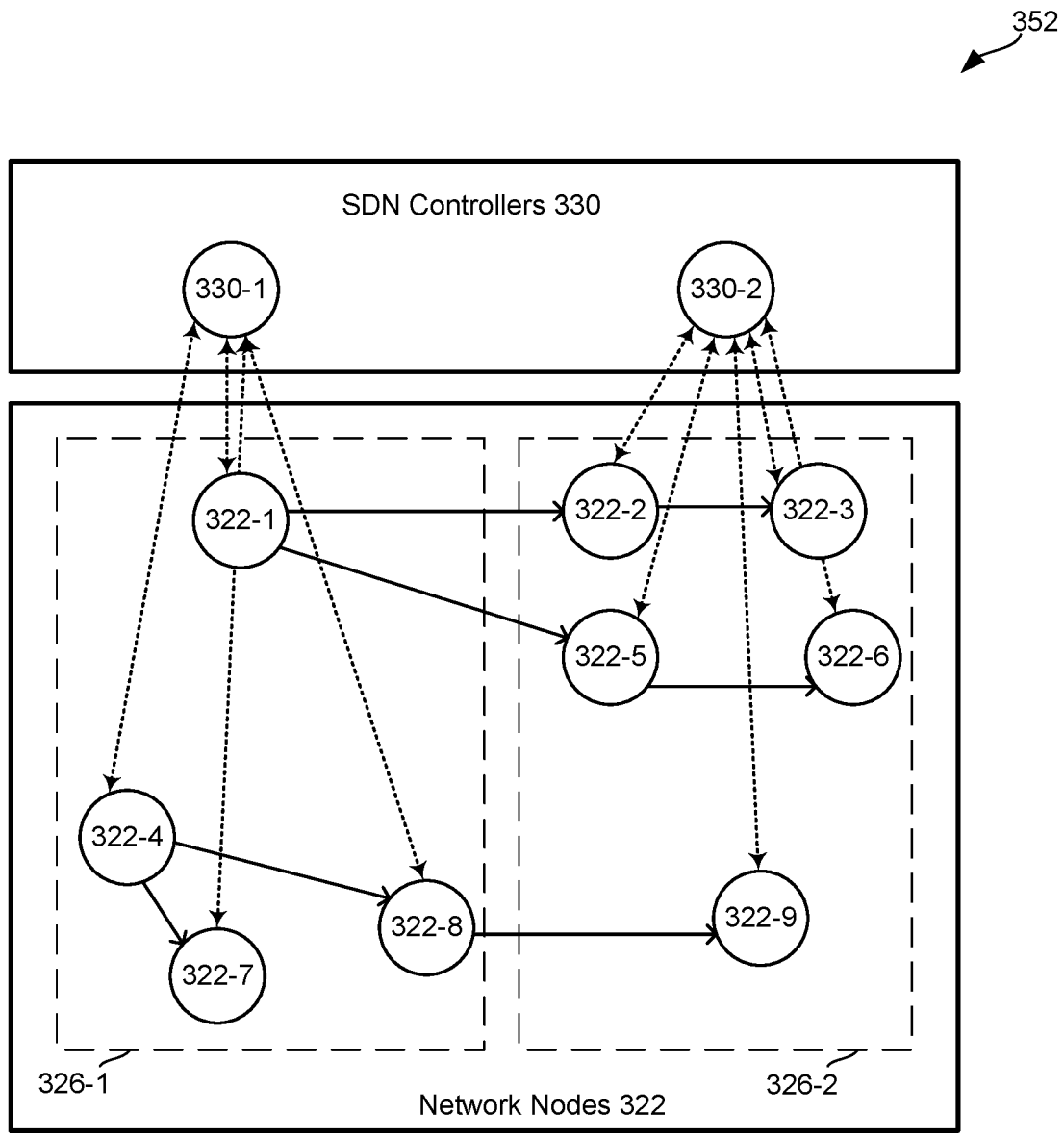
FIG. 7 is a block diagram of an example of a network environment including an example of node to controller assignments.

FIG. 7 is a block diagram of a network environment 352 having a configuration that further highlights the effects of controller assignments in a network having a tree topology. In FIG. 7, two isolated tree structures are formed in the SDN from the network nodes. Network nodes 322-1, 322-2, 322-3, 322-5, and 322-6 form a first tree structure having a root node 322-1. Network nodes 322-4, 322-7, 322-8, and 322-9 form a second tree structure having a root node 322-4.

In FIG. 7, two controllers 330-1 and 330-2 are deployed for control plane management of nodes 322-1 to 322-9. The controllers may be deployed at one or more servers. Controller 330-1 includes control links with nodes 322-1, 322-4, 322-7, and 322-8 which form a node cluster 326-1. Controller 330-2 includes control links with nodes 322-2, 322-3, 322-5, 322-6, and 322-9 which form a node cluster 326-2. The nodes are divided into two node partitions, also referred to as node clusters, with each partition including a distinct subset of the network nodes. Nodes 322-1, 322-4, 322-7, and 322-8 form a node cluster 326-1 controlled by controller 330-1. Nodes 322-2, 322-3, 322-5, 322-6, and 322-9 form a node cluster controlled by controller 330-2.

In FIG. 7, controller 330-1 controls the root node 322-1 of the first tree structure as well as the root node 322-4 of the second tree structure. In this fashion, if controller 330-1 fails, all communication links in the SDN will fail. In the example of FIG. 7, no consideration is given to the tree topology formed by the nodes in the SDN.

In accordance with one embodiment, the physical topology of a network is accessed and used to generate a network configuration including node to controller assignments. The tree topology of an SDN such as an access network can be identified and used to generate node to controller network assignments. A controller can access an SDN and identify one or more tree structures in the SDN. Each subset of nodes forming a tree structure includes a root node and at least one child node. Traffic to the at least one child node passes through the root node.

Figure 8:
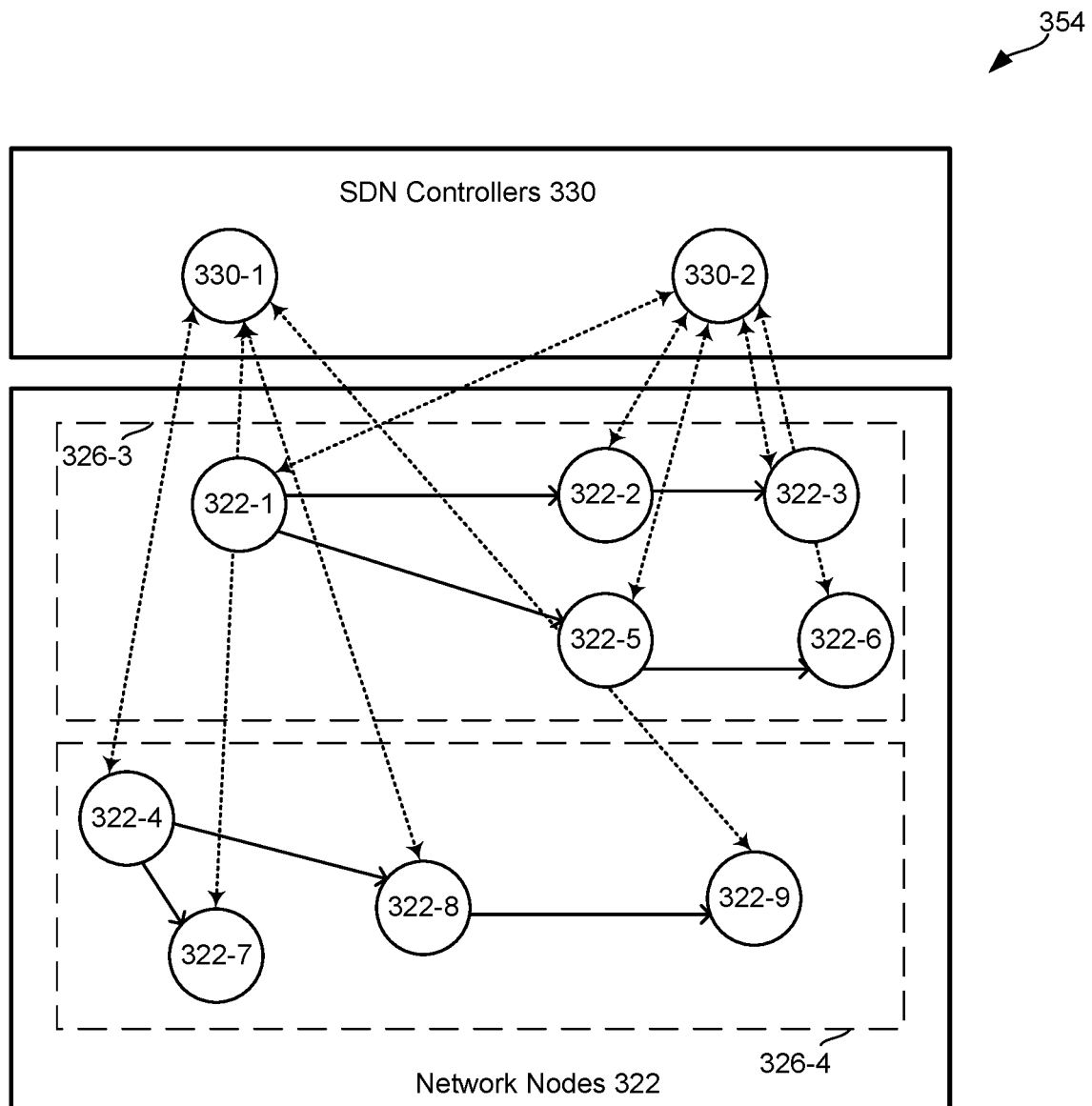
FIG. 8 is a block diagram of an example of a network environment including an example of node to controller assignments in one embodiment.

FIG. 8 is a block diagram of a network environment 354 having a network configuration including a node to controller assignment in accordance with one embodiment. In FIG. 8, the two isolated tree structures from FIG. 7 are again formed in the SDN from the network nodes. Network nodes 322-1, 322-2, 322-3, 322-5, and 322-6 form a first tree structure having a root node 322-1. Network nodes 322-4, 322-7, 322-8, and 322-9 form a second tree structure having a root node 322-4.

In FIG. 8, the SDN controllers are assigned to the nodes in a topology-aware manner that considers the physical topology of the nodes in the SDN. Specifically, the system accesses physical topology information that indicates that nodes 322-1 and 322-4 are isolated parent nodes. In this example, nodes 322-1 and 322-4 are root nodes. The system determines that the root nodes do not have any upstream nodes through which traffic flows to reach the root node. The system determines from the topology information that a first subset of nodes 322-2, 322-3, 322-5, and 322-6 are associated with root node 322-1 as child nodes as previously described in relation to FIGS. 6-7. The system determines that the child nodes in the first subset have a path to the root node 322-1. The system determines that a second subset of nodes 322-7, 322-8, and 322-9 are associated with root node 322-4 as child nodes. The system determines that the child nodes in the second subset have a path to the root node 322-4. From this information, the system determines that nodes 322-1, 322-2, 322-3, 322-5 and 322-6 form one isolated tree structure. Similarly, the system determines that nodes 322-4, 322-7, 322-8, and 322-9 form a second isolated tree structure.

In response to the physical topology information, the system creates a node cluster 326-3 and assigns nodes 322-1, 322-2, 322-3, 322-5 and 322-6 to the cluster. The system creates a second node cluster 326-4 and assigns nodes 322-4, 322-7, 322-8, and 322-9 to the cluster. The nodes in the first node cluster 326-3 are assigned to controller 330-2 and the nodes in the second node cluster 326-4 are assigned to controller 330-1. The system configures controller 330-1 for control of the nodes in the second cluster and controller 330-2 for control of the nodes in the first cluster. The system may configure a control link between controller 330-2 and each node in the first node cluster 326-3. The system may configure a control link between controller 330-1 and each node in the second node cluster 326-4. As described hereinafter, the system may consider the capacity of controllers 330 and the traffic associated with each node in making node assignments.

With the network configuration including the node to controller assignments shown in FIG. 8, the effects of controller failure are significantly different when compared with the network configuration in FIG. 7. In FIG. 8, if controller 330-1 fails, communication with the nodes in the first node cluster 326-3 is not affected. Only communication with the nodes in the second node cluster 326-4 will be affected by a failure of controller 330-1. Similarly, a failure of controller 330-2 will not affect communication the nodes in the second node cluster 326-4. Only communications with the nodes in the first node cluster 326-3 will be affected.

Figure 9:
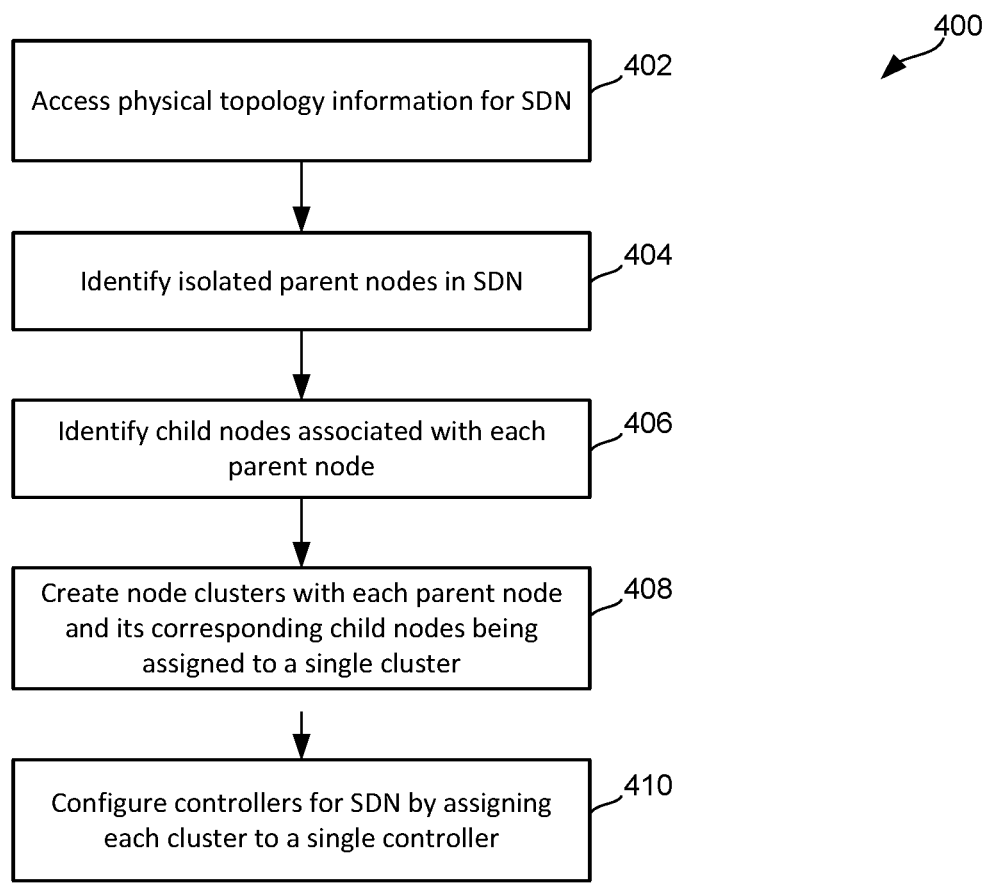
FIG. 9 is a flowchart describing one embodiment of a process of configuring node to controller assignments based on related nodes.

FIG. 9 is a flowchart describing one embodiment of a process 400 of configuring controllers for control and management of control plane functions of nodes in a software-defined network. FIG. 9 may be performed as part of generating a network configuration including a description for controlling the SDN. Process 400 may be performed in network environments such as environments 10, 50, 100, 200, and 300. Process 400, however, is not limited to being performed in such environments. Process 400 may be implemented in or by a server or other computing device to configure controllers and nodes for a SDN. Process 400 may be performed by a controller for an SDN such as a control plane controller 30, central controller 40, or SDN controller 130, 230, or 330. A controller to be assigned to nodes in the SDN may perform process 400, or process 400 may be performed by a controller not forming part of the control plane. A controller may be a dedicated controller, or may be implemented as a network management system, for example. In one embodiment, process 400 may be performed by a device at a node 322. The controller may be implemented as one or more circuits, in a specialized network device such as a router, for example. Alternatively, the process may be implemented in a processor, as processor readable code for programming a process for example.

At step 402, physical topology information is accessed for an SDN. A server for the SDN accesses the physical topology information in one embodiment. Physical topology information may be accessed by receiving one or more messages form the network nodes in one example. In another example, the information may be accessed by polling one or more network nodes or accessing one or more data stores containing the physical topology information. Physical topology information is information that describes the infrastructure and connections within the SDN, as well as connections to any external networks.

By way of example, physical topology information may include fiber topology and site information, traffic flow information, and network timing information. Topology and site information may include, but is not limited to, an optical reachability graph for the network, site specifications, fiber specifications, and network element specifications. Traffic flow information may include, but is not limited to, traffic flow type, traffic flow bearer type, traffic bandwidth profile, traffic protection profile, traffic flow routing constraints, traffic flow quality of service (QoS) requirements, and traffic flow operations, administration, and management (OAM) requirements. For example, traffic flow type may include, but is not limited to, Ethernet virtual private line (E-line), Ethernet virtual private local area network (E-LAN), and Ethernet virtual private tree (E-tree). Network timing information may include, but is not limited to, network timing system information. The optical reachability graph for the network is a representation that considers transmission impairments for a given physical fiber network and optical components configuration. In one embodiment, step 402 includes accessing a network description that identifies the physical topology.

At step 404, the server identifies from the physical topology information isolated parent nodes in the SDN. The server may identify nodes having no upstream nodes through which data flows to reach the node as root nodes.

At step 406, the server identifies any child nodes that are associated with each of the isolated parent nodes. For each parent node, the server may identify any nodes that are reached by passing through the parent node. Steps 404 and 406 may include identifying subsets of nodes in the SDN that form isolated tree structures. Each tree structure is isolated from each other tree structure in the SDN. Data to the nodes in each tree structure does not pass through nodes of any of the other tree structures.

At step 408, the server creates a plurality of node clusters based on the isolated parent nodes and their corresponding child nodes. In one embodiment, the system assigns a tree structure including a parent node and each child node corresponding to the parent node to one node cluster. A single tree structure may be assigned to a node cluster or multiple tree structures may be assigned to a node cluster. However, the system attempts to keep each parent node and its corresponding child nodes in a single node cluster.

At step 410, the server configures the controllers to handle control plane functions for the node clusters. For each node cluster, the system assigns every node to the same controller. In one embodiment, each node cluster is assigned to a different controller. In another embodiment, more than one node cluster may be assigned to a single controller.

In one embodiment, the system provides controller to node assignments based on minimizing traffic associated with the plurality of node clusters that are provisioned. The system may attempt to create node clusters having isolated nodes, while assigning the nodes to clusters in an effort to minimize the data and/or control traffic associated with each node cluster. For example, the system may attempt to minimize the total amount of data traffic between each node cluster and one or more networks. The one or more networks may include an external network, such as a backhaul network, internet, etc., or may include the access network itself. In this manner, the system can attempt to minimize traffic between nodes of different clusters within the access network. The system may attempt to minimize the upstream traffic between nodes of different clusters, and/or the downstream traffic between nodes of different clusters. In this manner, the system attempts to minimize the total amount of traffic including traffic between the nodes and external networks, as well as the traffic between nodes of different clusters in the access network.

In addition or alternatively to the data traffic, the system may attempt to minimize control traffic between the node clusters and the controllers. In doing so, the system may attempt to find an amount of control traffic that is optimal for processing by each controller. The system's determination may be limited by the maximum amount of control traffic that can be handled by a controller. For example, the sum of the control traffic in each node cluster may be limited by the total amount of control traffic that can be handled by the controller.

In one embodiment, a multiple-constraint graph-partition algorithm is provided to determine an optimal partitioning of an SDN. Consider a graph G representing an SDN having a plurality of nodes and K controllers provided for managing control plane functions for the nodes of the SDN. The system may attempt to determine a number of nodes k that should be in each node cluster (i.e., each partition) based on minimizing an amount of data and/or control traffic between each node cluster and one or more external networks. As earlier described, the traffic may be traffic between nodes of different clusters and/or traffic between a node cluster and an external network. The system can attempt to determine an optimal number of nodes for each partition according to Equation 1 in one example.

$$\sum_{i=1}^{k-1}\sum_{j=i+1}^{k}\sum_{\substack{v_1 \in C_i \\ v_2 \in C_j}} w(\{v_1, v_2\}) \qquad \text{Equation 1}$$

Using equation 1, the system attempts to minimize the amount of traffic, represented as a weight w, that is transferred to or from the partitions to the networks. Ci represents one partition and Cj represents another partition. The variable "i" can range from 1 to k−1. Any node in the partition Ci is represented by vi and any node in the partition Cj is represented by vj.

According to equation 1, the system determines a weight w representing the traffic between a node vi in a partition Ci and a node vj in a partition Cj. The system determines the connecting links between the two nodes in the different partitions and calculates a weight for the traffic between the two nodes.

In one embodiment, the weight w is determined according to Equation 2.

$$w = U_{i,j} + D_{i,j}$$ Equation 2

In Equation 2, $U_{i,j}$ represents the upstream traffic from a node i and a node j. $D_{i,j}$ represents the downstream traffic from a node i to a node j. The system then determines a weight representing the total upstream and downstream traffic between two nodes. The system can provide a summation equal to the total weight of all traffic from each partition to the network.

The system applies the summations as shown to determine a value of k that minimizes the amount of traffic between nodes assigned to different partitions. The system then assigns a number of nodes equal to k to a node cluster. Each node cluster is assigned to one controller. As noted earlier, the system may also determine subsets of related nodes, such as a tree structure including a root node and any child nodes of the root node. When assigning the nodes to each node cluster, the system attempts to assign each parent node and its corresponding child nodes to the same node cluster.

In one embodiment, the system applies Equation 1 subject to the maximum amount of control traffic that can be handled by a controller. For example, the system limits any partition based on the total amount of control traffic that can be handled by a controller for the partition. The system will not assign a number of nodes that causes the control traffic to exceed a limit imposed on each partition or controller in one example.

Figure 10:
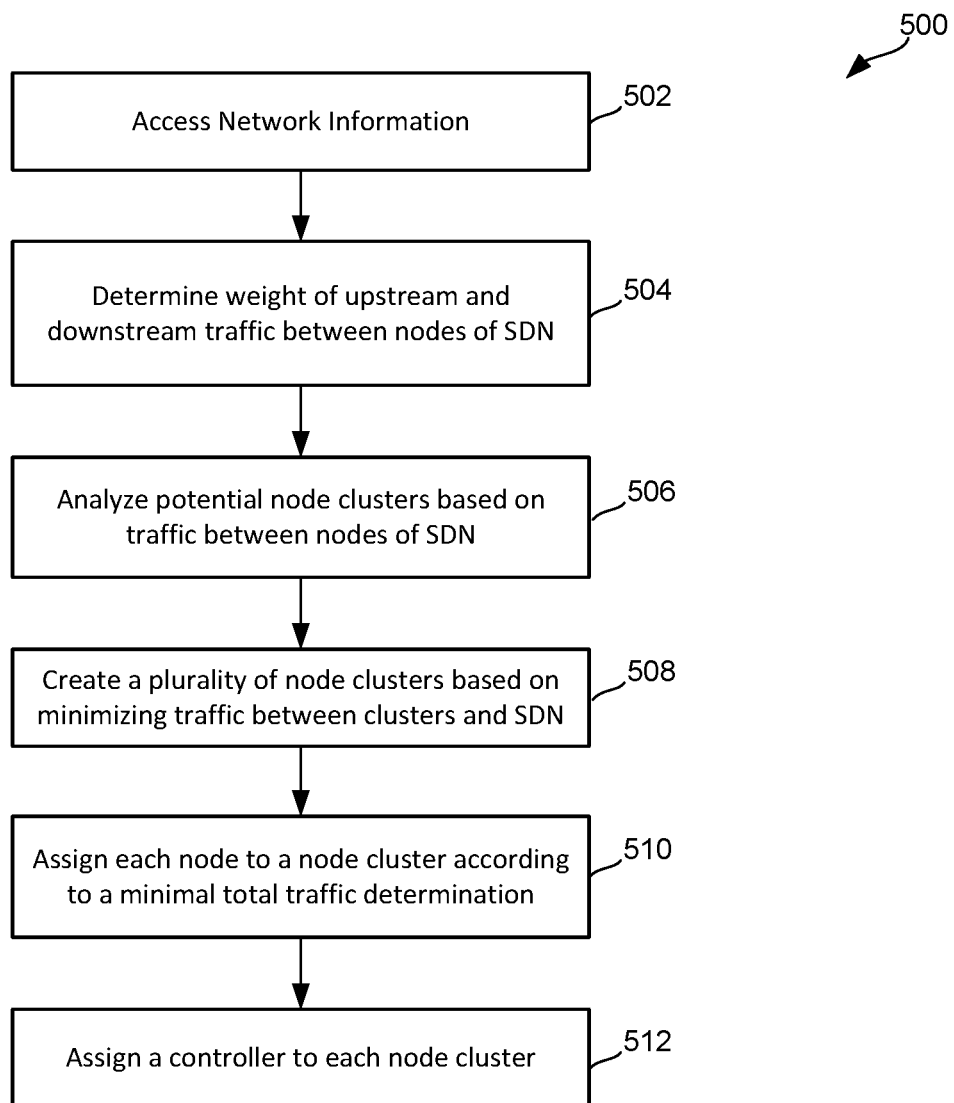
FIG. 10 is a flowchart describing one embodiment of a process of configuring node to controller assignments based on traffic.

FIG. 10 is a flowchart describing one embodiment of a process 500 of configuring controllers for control and management of control plane functions of nodes in a software-defined network. Process 500 attempts to minimize traffic associated with an SDN while creating node clusters and assigning the clusters to a controller.

Process 500 may be performed as part of generating a network configuration including a description for controlling the SDN. Process 500 may be performed in network environments such as environments 10, 50, 100, 200, and 300. Process 500, however, is not limited to being performed in such environments. Process 500 may be implemented in or by a server or other computing device to configure controllers and nodes for a SDN. Process 500 may be performed by a controller for an SDN such as a control plane controller 30, central controller 40, or SDN controller 130, 230, or 330. A controller to be assigned to nodes in the SDN may perform process 500, or process 500 may be performed by a controller not forming part of the control plane. A controller may be a dedicated controller, or may be implemented as a network management system, for example. In one embodiment, process 500 may be performed by a device at a node 322. The controller may be implemented as one or more circuits, in a specialized network device such as a router, for example. Alternatively, the process may be implemented in a processor, as processor readable code for programming a process for example.

At step 502, network information is accessed for an SDN. A server for the SDN accesses the network information in one embodiment. Network information may be accessed by receiving one or more messages form the network nodes in one example. In another example, the information may be accessed by polling one or more network nodes or accessing one or more data stores containing the information. In one embodiment, the network information includes traffic data associated with nodes in the SDN. The data may include data received at a node and/or data transmitted from a node. In one embodiment, the network information includes physical topology information describing the infrastructure and connections within the SDN, as well as connections to any external networks.

At step 504, the system determines a weight representing the total traffic between pairs of nodes in the SDN. The weight may represent upstream and/or downstream traffic between the pairs of nodes.

At step 506, the system analyzes potential node clusters that can be created in the SDN based on the traffic weights. In one embodiment, the system analyzes potential clusters to determine a partitioning of nodes into clusters so as to minimize a total amount of traffic between nodes and one or more networks. The one or more networks may include the SDN such that the system attempts to minimize the traffic between nodes of different node clusters. The one or more networks may also include external networks so as to minimize traffic between the node clusters and nodes external to the SDN. In one embodiment, step 606 includes steps 402, 404, and 406 of FIG. 9.

At step 508, the system creates a plurality of node clusters based on minimizing the traffic between the node clusters and the SDN. Step 608 may include determining a number of nodes to assign to each node cluster so as to minimize traffic between node clusters. Step 508 may alternately or additionally include determining the number of nodes so as to minimize traffic between the node clusters and external networks. A total weight representing the traffic associated with each potential node cluster may be determined. Step 508 may also include considering an amount of control traffic associated with each node cluster. For example, the system may limit the number of nodes in each node cluster based on a maximum amount of control traffic for each cluster or a controller assigned to the cluster.

At step 510, the system assigns each node in the SDN to one of the node clusters according to a minimal total traffic determination from step 508. In one embodiment, the system assigns nodes according to the number of nodes determined for each node partition to minimize traffic. Step 510 may include assigning a single tree structure to each node cluster, or assigning multiple tree structures to each node cluster.

In one embodiment, step 510 includes a consideration of the physical topology of the SDN in making the node assignments for the node clusters. In one embodiment, step 510 includes or can apply the results of steps 404-406 of process 400. For example, the system may identify related nodes including a parent node and its corresponding child nodes. When assigning nodes to each cluster, the system assigns related nodes to the same node cluster. In this manner, the system does not assign the related parent and child nodes of a tree structure to different node clusters and different controllers.

At step 512, the system assigns a controller to each node cluster. Step 512 may include creating or updating a network configuration for the SDN. In one embodiment, step 512 includes creating or assigning a control link between a controller and each node in a corresponding node cluster.

Figure 11:
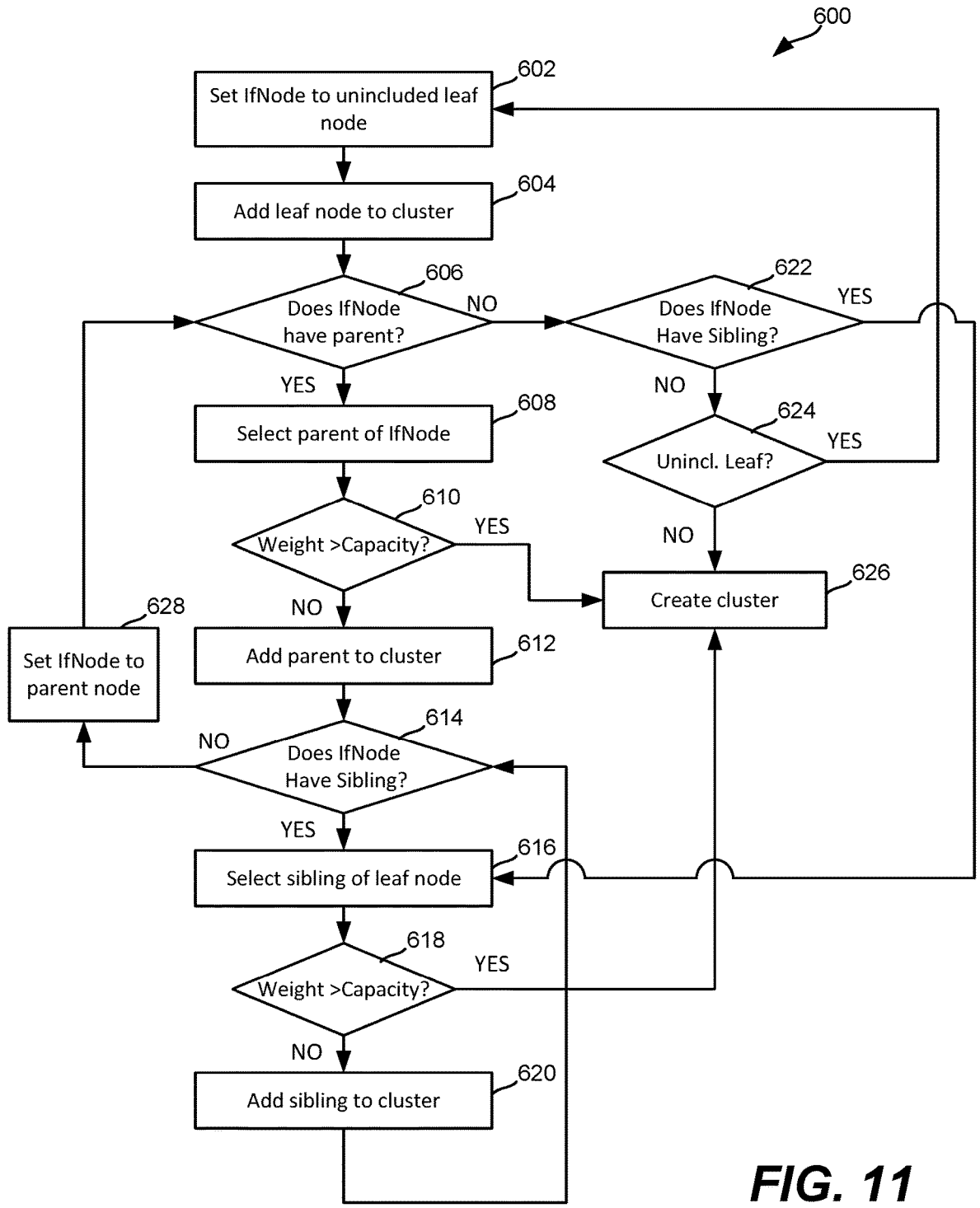
FIG. 11 is a flowchart describing one embodiment of a process of configuring node to controller assignments based on related nodes and traffic.

FIG. 11 is a flowchart describing a process of generating a node cluster based on traffic capacity or bandwidth associated with controllers and a traffic weight associated with each node. A traffic weight is a weighted measure of the amount of user and/or control traffic associated with a node. Any suitable measurement representing traffic for a node can be used as the traffic weight. A traffic weight for each node can be determined as described above. A traffic weight can be assigned to each node after determination for purposes of creating node clusters. A controller 330 may have a maximum control traffic capacity that it can handle. For example, a controller may be associated with a maximum bandwidth. The bandwidth can be determined based on the controller capabilities or based on other capabilities, limitations, or needs of a particular implementation. In one embodiment, a system can assign or determine a maximum bandwidth for a controller.

The process of FIG. 11 attempts to assign related child and parent nodes to the same cluster, while considering the traffic associated with each node and the capacity of a controller to which the cluster will be assigned.

At step 602, a variable IfNode is set to a leaf node that currently is not included in any node cluster. The system may select a leaf node at random or may use a predefined process for selecting leaf nodes. The leaf node is added to a node cluster at step 604. At step 606, the process determines if the leaf node has a parent node. If the leaf node IfNode has a parent node, the parent node is selected at step 608. At step 610, the system determines if the combined weight of the parent node and the leaf node IfNode is greater than a capacity of a controller for the node cluster. If the weight is greater than the capacity of the controller, the parent node is not added to the node cluster and a node cluster with IfNode is created at step 626.

If the combined weight is less than or equal to the capacity, the parent node is added to the node cluster at step 612. At step 614, the system determines if the leaf node IfNode has any siblings. A sibling node of a selected node is a node at the same level of the tree as the sibling node. A sibling node has a direct upstream connection to the same parent node as the selected node.

If IfNode has a sibling, a sibling is selected at step 616. At step 618, the system determines if the combined weight for the cluster after adding the sibling node is greater than the controller capacity. If the weight exceeds the controller capacity, the sibling node is not added and the cluster is created at step 626 with the parent node and leaf node IfNode.

If the weight does not exceed the capacity, the sibling is added to the node cluster at step 620. The process then returns to step 614 to determine if the leaf node has additional siblings. If the leaf node has no more siblings, the process proceeds to step 628. The variable IfNode is set to the parent of the current leaf node. The process then returns to step 606 to determine if the new node IfNode has a parent node. If so, the process repeats beginning at step 608 by selecting the parent of the new IfNode. In this manner, the system will begin with a leaf node and attempt to assign related nodes (parents and siblings) to the same cluster, and will continue in an upstream direction until the controller capacity is reached or an additional parent node is not found.

Once an additional parent node to the current IfNode is not found at step 606, the process determines if the current IfNode has any siblings at step 622. If IfNode has a sibling, the sibling is selected and the process continues at step 616. If IfNode does not have a parent and does not have a sibling, the process proceeds to step 624 to select another unincluded leaf node. If no leaf nodes remain, the node cluster is created at step 626. If another leaf node remains, the process returns to step 602. Although not shown, the process may first determine if adding the unincluded leaf node would exceed the capacity. If so, the node cluster is created without the additional leaf node. If not, the process returns to step 602.

Figure 12:
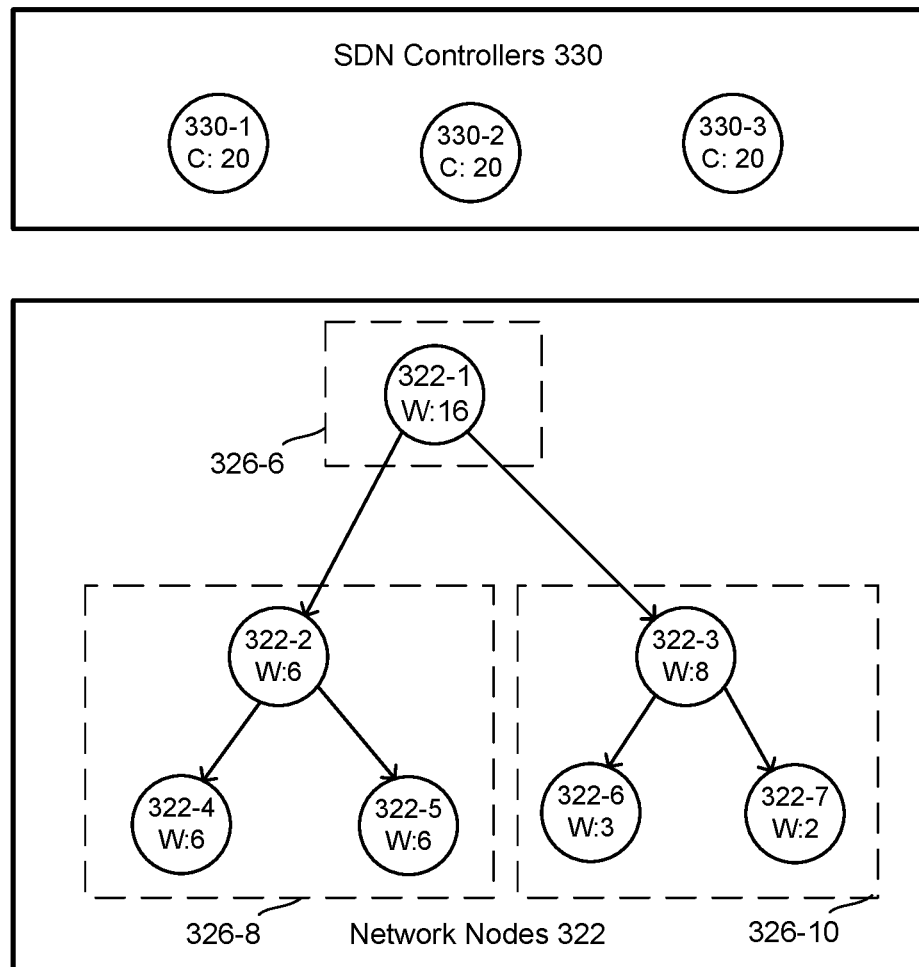
FIG. 12 is a block diagram illustrating a process of assigning nodes to node clusters in one embodiment.

FIG. 12 depicts a specific example of applying the process in FIG. 12. Three controllers are depicted with a set of seven network nodes. The network nodes include a root node 322-1, and leaf nodes 322-2, 322-3, 322-4, 322-5, 322-6, and 322-7. A capacity C is associated with each controller. The capacity represents a maximum traffic for the controller. The capacity may represent a maximum bandwidth for control traffic of the controller in one example. The capacity may be represented in any suitable form. In the particular example, each controller is associated with a capacity of 20.

A weight W is associated with each network node. The weight represents an amount of traffic associated with each node. The weight can be a weighted traffic measure. The traffic may be a sum of upstream and downstream traffic associated with each node. Any suitable form may be used to represent the weight. In this particular example, root node 322-1 has a weight 16, node 322-2 has a weight of 6, node 322-3 has a weight of 8, node 322-4 has a weight of 6, node 322-5 has a weight of 6, node 32-6 has a weight of 3, and node 322-7 has a weight of 2.

The system creates node clusters 326-6, 326-8, and 326-10. Cluster 326-6 includes node 322-1. Cluster 322-8 includes clusters 322-4, 322-5, and 322-2. Cluster 326-10 includes cluster 322-6, 322-7, and 322-3. The system creates the node clusters beginning with one of the leaf nodes. For example, the system may begin with leaf node 322-4 having a weight of 6. The system adds leaf node 322-4 to cluster 326-8. The system then selects the parent node 322-2 of leaf node 322-4. Parent node 322-2 has a weight of 6. The system determines that the combined weight of 12 is less than the controller capacity of 20. Accordingly, the system adds the parent node 322-2 to cluster 326-8. The system then selects the sibling node 322-5 of leaf node 322-4. The system determines that the combined weight of 18 is less than the controller capacity of 20. After determining that node 322-4 has no more siblings, the system then selects the parent of node 322-2. The system determines that the combined weight of 34 is greater than the capacity 20 of the controller. Accordingly, the system does not add node 322-1 to cluster 326-8.

The system then selects another leaf node to begin the process again. The system selects leaf node 322-6 and adds it to cluster 326-10. The system selects parent node 322-2 and determines that the combined weight of 11 is less than the capacity 20 of the controller. Accordingly, the system adds parent node 322-2 to the cluster. The system then selects sibling node 322-7 and determines that the combined weight of 13 is less than the capacity of 20. The system adds node 322-7 to the cluster. After determining that node 322-6 has no more siblings, the system then selects the parent of node 322-3. The system determines that the combined weight of 29 is greater than the capacity 20 of the controller. Accordingly, the system does not add node 322-1 to cluster 326-10. The system then creates a final cluster 326-6 for the remaining root node 322-1.

Increasingly, the nodes in SDNs are provisioned with devices have extended capabilities. For example, optical line terminals (OLTs) may incorporate multiple gigabit passive optical line terminal (GPON) system-on-chips (SOCs). In such implementations, an optical line terminal may cover a large area use a large number of passive optical network (PON) ports. In some cases, all of the devices associated with a single OLT or other terminal may not be able to be handled by a single controller. A single controller may not be capable of handling all of the requests from the nodes covered by a single controller.

The disclosed technology may be used to configure controller assignments to individual ports on devices at nodes within an SDN. In one embodiment, individual ports of a single optical line terminal may be assigned to different controllers for control plane management.

Figure 13:
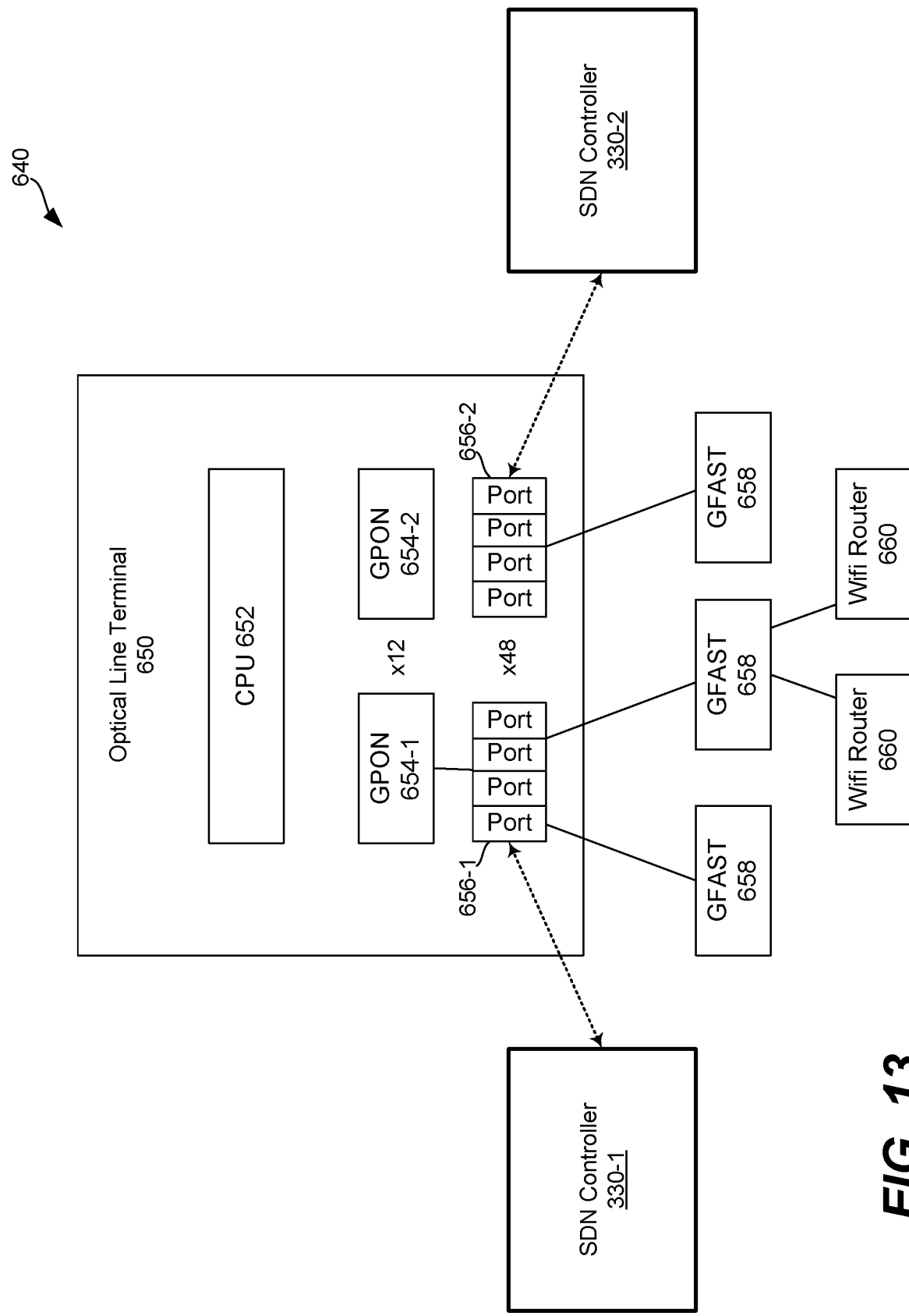
FIG. 13 is a block diagram of network environment illustrating controller to port assignments.

FIG. 13 is a block diagram of network environment 640 including multiple controller assignments to ports of a single OLT. Network environment 540 includes an optical line terminal 650 and two SDN controllers 330-1 and 330-2. Two controllers are shown by way of example as any number of controllers may be used. The OLT 650 includes a CPU 652 and multiple GPONs. Twelve GPONs are shown by way of example including two GPON SoCs 654-1 and 654-2. Each GPON SoC connects to four ports making a total of 48 ports. Ports 656-1 are connected to GPON 654-1 and ports 656-2 are connected to GPON 654-2. FIG. 13 shows an example where the ports 656-1 couple to GFAST routers 658. As shown, the GFAST routers may connect to WiFi routers 660 or other end user equipment.

According to one embodiment, ports 656-1 are assigned to the first SDN controller 330-1 and ports 656-2 are assigned to the second SDN controller 330-2. This assignment is shown by way of example. A controller can be assigned to any number of ports, including a single port up to one less than all of the ports.

The ports can be assigned to different controllers in recognition that the ports of the OLT are actually independent devices. In this manner, different controllers for the management of different ports of a single device may provide higher availability.

Figure 14:
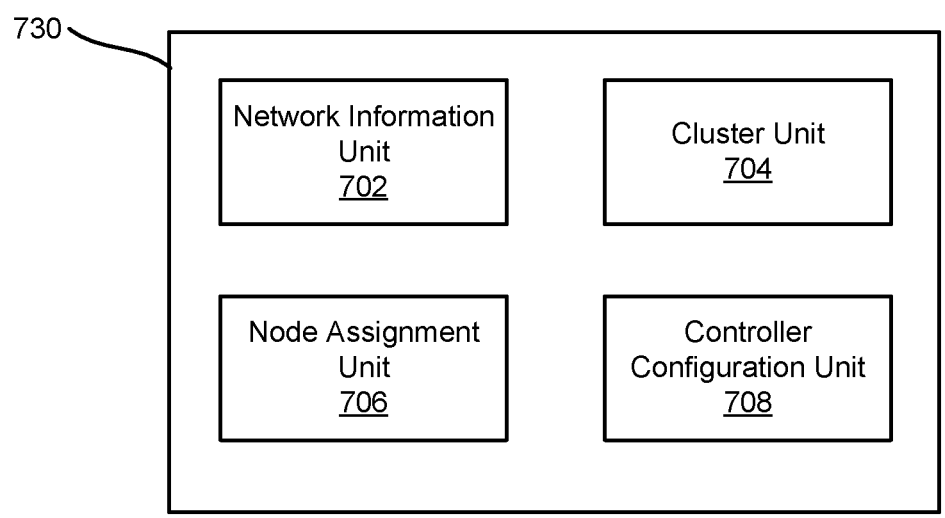
FIG. 14 is a block diagram of one embodiment of one or more servers.

FIG. 14 is a block diagram of one embodiment of one or more servers 730 for configuring a software-defined network (SDN) such controller to network node assignments in an access network. In one embodiment, the server 730 may include an SDN controller. The server may alternately include an external controller or a dedicated controller for configuring an SDN. The server may also include a client device or other network device configured as described. In certain embodiments, processes 400, 500 and 600 may be performed based on server 730. The units may be implemented at a single server, or may be distributed across multiple servers.

The server includes a network information unit 702, a cluster unit 704, a node assignment unit 706, and a controller configuration unit 708. The various units could be implemented with any combination of hardware and/or software.

In general, the network information unit 702 may be configured to access network information such as traffic information and/or physical topology information for one or more SDNs. Network information unit 702 is one example of a network information access means. Unit 702 is one example of a means for accessing network information which may include traffic information and/or physical topology information for a plurality of nodes and a plurality of links connecting at least a subset of the nodes. Information unit is one example of a unit for assigning or determining a weight representing a total amount of traffic associated with a node. Information unit can determine a combined weight of multiple nodes and determine whether the combined weight is less than a capacity of a controller for a node cluster. Unit 702 is one example of a means for determining a weight associated with traffic between nodes of different node clusters and/or traffic between node clusters and an external network. Unit 702 is one means for determining parent nodes that are isolated from other parent nodes in an SDN.

Cluster unit 704 is configured to generate a plurality of node clusters from a plurality of nodes in an SDN. Unit 704 is one example of a means for creating a plurality of node clusters based on minimizing a total amount of traffic connecting nodes within each node cluster to one or more networks. Unit 704 is one example of a means for determining parent nodes that are isolated from other parent nodes. Unit 704 is one example of a means for creating node clusters that include an isolated parent node and child nodes corresponding to the isolated parent node.

Node assignment unit 706 is configured to assign each node of an SDN to one of a plurality of node clusters. Node assignment unit 706 is one example of a means for assigning related nodes such as related parent and child nodes to the same node cluster. Node assignment unit 706 is one example of a means for assigning nodes to one of a plurality of node clusters in accordance with a minimal total traffic determination.

Controller configuration unit 708 is configured to provide or configure node clusters for control by particular controllers in a multiple controller network environment. Unit 708 is one example of a means for configuring nodes for control by a particular controller. Unit 708 is one example of a means for creating a control link between a controller and a node. Unit 708 is one example of a means for configuring each of a plurality of controllers for control of a subset of nodes associated with one or more node clusters.

Figure 15:
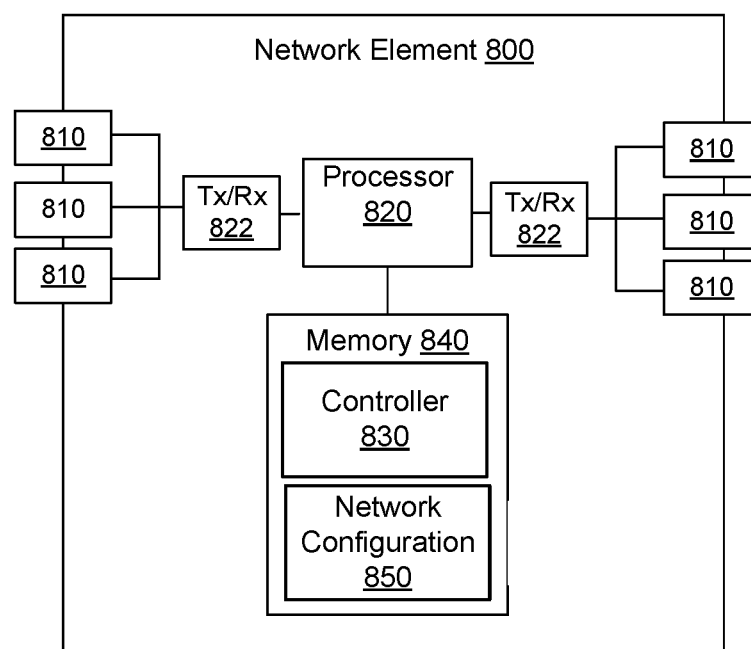
FIG. 15 is a block diagram of one embodiment of a network element.

FIG. 15 is a block diagram of one embodiment of a network element 800. Network element 800 may be suitable for implementing the disclosed embodiments. Network element 800 may be any device (e.g., a modem, a switch, router, bridge, server, client, controller, etc.) that transports or assists with transporting data through a network, system, and/or domain. For example, network element 800 may be used to implement user equipment 56, base station 58, controllers 30, 40, 130, 230, 330, server 730, and nodes 22, 122, 124, 222, 322. Network element 800 may be used to implement other devices described herein.

Network element 800 comprises ports 810, transceiver units (Tx/Rx) 822, a processor 820, and a memory 840. The processor 820 is coupled to the memory 840 and to the Tx/Rx 822. Ports 810 are coupled to Tx/Rx 822, which may be transmitters, receivers, or combinations thereof. The Tx/Rx 822 may transmit and receive data via the ports 810. Processor 820 is configured to process data. Memory 840 is configured to store data and instructions for implementing embodiments described herein. In one embodiment, memory 840 implements server 730 and the various units described therein.

The network element 800 may also comprise electrical-to-optical (EO) components and optical-to-electrical (OE) components coupled to the ports 810 and Tx/Rx 822 for receiving and transmitting electrical signals and optical signals.

The processor 820 may be implemented by hardware and software. The processor 820 may be implemented as one or more central processing unit (CPU) chips, logic units, cores (e.g., as a multi-core processor), field-programmable gate arrays (FPGAs), application specific integrated circuits (ASICs), and digital signal processors (DSPs). The processor 820 is in communication with the ports 810, Tx/Rx 822, and memory 840.

The memory 840 comprises one or more of disks, tape drives, and solid-state drives and may be used as an over-flow data storage device, to store programs when such programs are selected for execution, and to store instructions and data that are read during program execution. The memory 840 may be volatile and non-volatile and may be read-only memory (ROM), random-access memory (RAM), ternary content-addressable memory (TCAM), and static random-access memory (SRAM). The controller 830 comprises programming, instructions, or routines capable of being executed by the processor 820 in one embodiment. The controller may be implemented by processor 820 to execute the instructions for accessing network information and configuring controller to node assignments in an SDN. The inclusion of server 730 or any one of the units described therein provide an improvement to the functionality of network element 800. These units effect a transformation of network element 800 to a different state.

Figure 16:
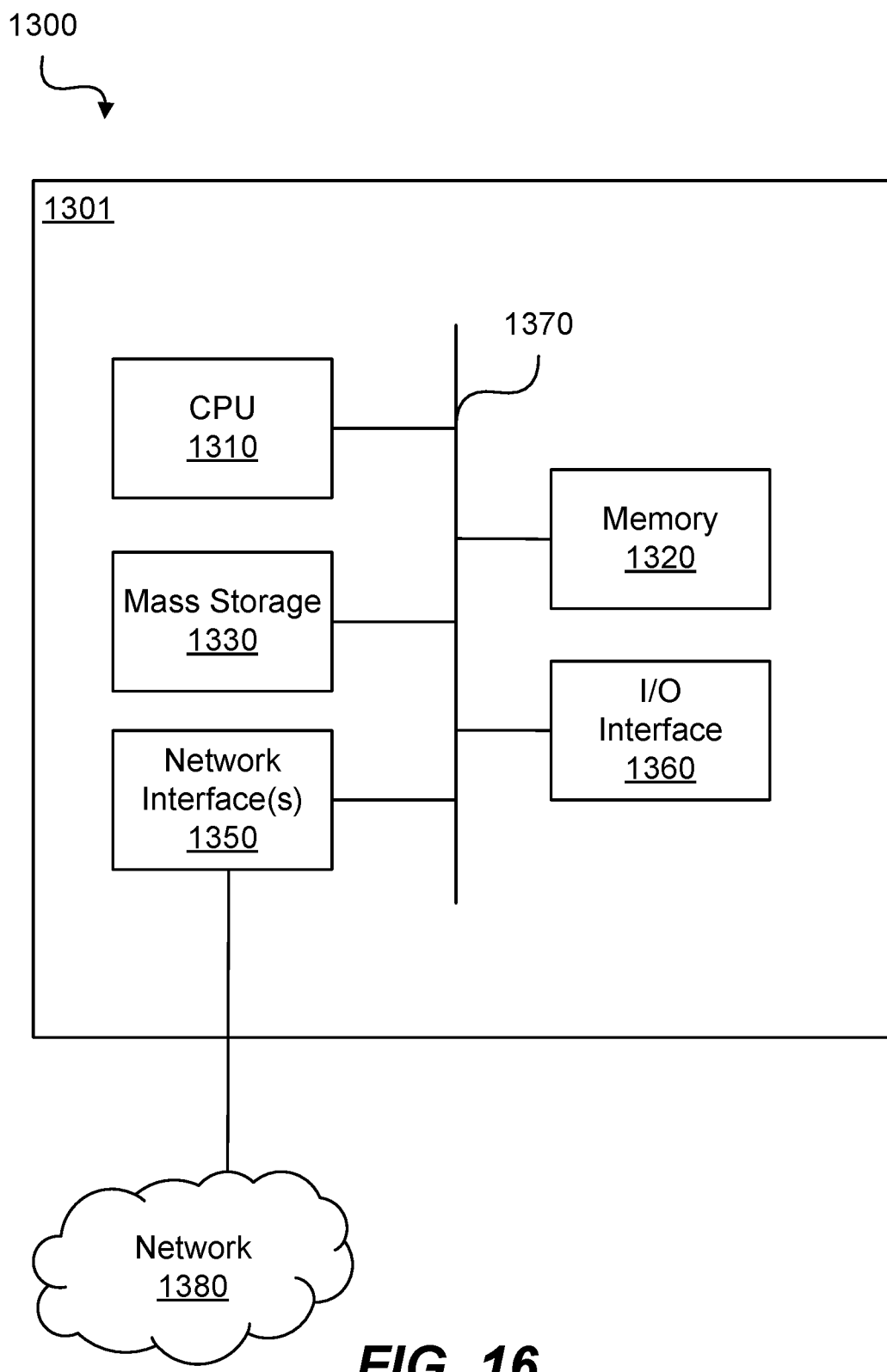
FIG. 16 is a high level block diagram of a computing system.

FIG. 16 is a high level block diagram of a computing system 1300 that can be used to implement various embodiments. In one example, computing system 1300 is a network system 1300. Specific devices may utilize all of the components shown, or only a subset of the components, and levels of integration may vary from device to device. Furthermore, a device may contain multiple instances of a component, such as multiple processing units, processors, memories, transmitters, receivers, etc.

The network system may comprise a processing unit 1301 equipped with one or more input/output devices, such as network interfaces, storage interfaces, and the like. The processing unit 1301 may include a central processing unit (CPU) 1310, a memory 1320, a mass storage device 1330, and an I/O interface 1360 connected to a bus. The bus may be one or more of any type of several bus architectures including a memory bus or memory controller, a peripheral bus or the like. Processing unit 1301 may be used to implement any of the computing devices described herein, such as a server, controller, and/or client device.

The CPU 1310 may comprise any type of electronic data processor. The CPU 1310 may be configured to implement any of the schemes described herein, such as processes 400, 500, and 600 using any one or combination of steps described in the embodiments. The memory 1320 may comprise any type of system memory such as static random access memory (SRAM), dynamic random access memory (DRAM), synchronous DRAM (SDRAM), read-only memory (ROM), a combination thereof, or the like. In an embodiment, the memory 1320 may include ROM for use at boot-up, and DRAM for program and data storage for use while executing programs. In embodiments, the memory 1320 is non-transitory. The mass storage device 1330 may comprise any type of storage device configured to store data, programs, and other information and to make the data, programs, and other information accessible via the bus. The mass storage device 1330 may comprise, for example, one or more of a solid state drive, hard disk drive, a magnetic disk drive, an optical disk drive, or the like.

The processing unit 1301 also includes one or more network interfaces 1350, which may comprise wired links, such as an Ethernet cable or the like, and/or wireless links to access nodes or one or more networks 1380. The network interface 1350 allows the processing unit 1301 to communicate with remote units via the network 1380. For example, the network interface 1350 may provide wireless communication via one or more transmitters/transmit antennas and one or more receivers/receive antennas. In an embodiment, the processing unit 1301 is coupled to a local-area network or a wide-area network for data processing and communications with remote devices, such as other processing units, the Internet, remote storage facilities, or the like. In one embodiment, the network interface 1350 may be used to receive and/or transmit events, messages, data, routing information, etc. in an SDN. Herein, the term "network interface" will be understood to include a port.

The processing unit 1301 may be configured to implement any of the schemes described herein, such as the processes 400, 500 and 600 using any one or combination of steps described in the embodiments.

The components depicted in the computing system of FIG. 16 are those typically found in computing systems suitable for use with the technology described herein, and are intended to represent a broad category of such computer components that are well known in the art. Many different bus configurations, network platforms, and operating systems can be used.

The technology described herein can be implemented using hardware, software, or a combination of both hardware and software. The software used is stored on one or more of the processor readable storage devices described above (e.g., memory 1320 or mass storage 1330) to program one or more of the processors to perform the functions described herein. The processor readable storage devices can include computer readable media such as volatile and non-volatile media, removable and non-removable media. By way of example, and not limitation, computer readable media may comprise computer readable storage media and communication media. Computer readable storage media is non-transitory and may be implemented in any method or technology for storage of information such as computer readable instructions, data structures, program modules or other data. Examples of computer readable storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as RF and other wireless media. Combinations of any of the above are also included within the scope of computer readable media.

The computer-readable non-transitory media includes all types of computer readable media, including magnetic storage media, optical storage media, and solid state storage media and specifically excludes signals. It should be understood that the software can be installed in and sold with a router, client, or other network device. Alternatively the software can be obtained and loaded into a device, including obtaining the software via a disc medium or from any manner of network or distribution system, including, for example, from a server owned by the software creator or from a server not owned but used by the software creator. The software can be stored on a server for distribution over the Internet, for example.

In alternative embodiments, some or all of the software can be replaced by dedicated hardware including custom integrated circuits, gate arrays, FPGAs, PLDs, and special purpose computers. In one embodiment, software (stored on a storage device) implementing one or more embodiments is used to program one or more processors. The one or more processors can be in communication with one or more computer readable media/storage devices, peripherals and/or communication interfaces. In alternative embodiments, some or all of the software can be replaced by dedicated hardware including custom integrated circuits, gate arrays, FPGAs, PLDs, and special purpose computers. In embodiments, the term "unit" may include a circuit (or integrated circuit) or software component.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope of the invention be defined by the claims appended hereto.

The disclosure has been described in conjunction with various embodiments. However, other variations and modifications to the disclosed embodiments can be understood and effected from a study of the drawings, the disclosure, and the appended claims, and such variations and modifications are to be interpreted as being encompassed by the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate, preclude or suggest that a combination of these measures cannot be used to advantage. A computer program may be stored or distributed on a suitable medium, such as an optical storage medium or a solid-state medium supplied together with, or as part of, other hardware, but may also be distributed in other forms, such as via the Internet or other wired or wireless telecommunication systems.

The invention claimed is:

1. A computer-implemented method for network management, comprising:
   accessing, by one or more processors, network information for a plurality of nodes, each node associated with at least one device;
   creating, by the one or more processors, a plurality of node clusters based on a system's minimizing a total amount of traffic connecting nodes within each node cluster to one or more networks;
   assigning, by the one or more processors, each of the plurality of nodes to one of the plurality of node clusters in accordance with a minimal total traffic determination; and
   configuring, by the one or more processors, each of a plurality of controllers for control of a subset of the plurality of nodes associated with one or more of the node clusters;
   wherein the plurality of node clusters comprises a first node cluster and a second node cluster, the first node cluster comprises a first subset of the plurality of nodes, the second node cluster comprises a second subset of the plurality of nodes, the first node cluster is isolated from the second node cluster; and
   wherein the first subset of the plurality of nodes comprises: at least one first parent node and a first group of child nodes having a first data path through the at least one first parent node, the second subset of the plurality of nodes comprises: at least one second parent node and a second group of child nodes having a second data path through the at least one second parent node, the at least one first parent node is isolated from the at least one second parent node, and a first controller controls the at least one first parent node and the first group of child nodes, a second controller controls the at least one second parent node and the second group of child nodes.

2. The computer-implemented method of claim 1, wherein:
   each node cluster includes a subset of nodes of the plurality that is isolated from other nodes of other node clusters.

3. The computer-implemented method of claim 1, wherein creating a plurality of node clusters includes minimizing a sum of a set of weights representing the total amount of traffic between each node cluster and the one or more networks.

4. The computer-implemented method of claim 3, wherein the total amount of traffic between each node cluster and the one or more networks includes:
   a sum of upstream traffic between nodes of different clusters; and
   a sum of downstream traffic between nodes of different clusters.

5. The computer-implemented method of claim 1, wherein configuring each controller for control of a subset of nodes associated with one or more of the node clusters includes creating a control link between the controller and each node of a corresponding cluster.

6. A non-transitory computer-readable medium storing computer instructions for network management, that when executed by one or more processors, cause the one or more processors to perform the steps of:
   access network information for a plurality of nodes, each node associated with at least one device;
   create a plurality of node clusters based on a system's minimizing a total amount of traffic connecting nodes within each node cluster to one or more networks;
   assign each of the plurality of nodes to one of the plurality of node clusters in accordance with a minimal total traffic determination; and
   configure each of a plurality of controllers for control of a subset of the plurality of nodes associated with one or more of the node clusters;
   wherein the plurality of node clusters comprises a first node cluster and a second node cluster, the first node cluster comprises a first subset of the plurality of nodes, the second node cluster comprises a second subset of the plurality of nodes, the first node cluster is isolated from the second node cluster; and
   wherein the first subset of the plurality of nodes comprises: at least one first parent node and a first group of child nodes having a first data path through the at least one first parent node, the second subset of the plurality of nodes comprises: at least one second parent node and a second group of child nodes having a second data path through the at least one second parent node, the at least one first parent node is isolated from the at least one second parent node, and a first controller controls the at least one first parent node and the first group of child nodes, a second controller controls the at least one second parent node and the second group of child nodes.

7. The non-transitory computer-readable medium of claim 6, wherein:
   each node cluster includes a subset of nodes of the plurality that is isolated from other nodes of other node clusters.

8. The non-transitory computer-readable medium of claim 6, wherein creating a plurality of node clusters includes minimizing a sum of a set of weights representing the total amount of traffic between each node cluster and the one or more networks.

9. The non-transitory computer-readable medium of claim 8, wherein the total amount of traffic between each node cluster and the one or more networks includes:
   a sum of upstream traffic between nodes of different clusters; and
   a sum of downstream traffic between nodes of different-clusters.

10. The non-transitory computer-readable medium of claim 6, wherein configuring each controller for control of a subset of nodes associated with one or more of the node clusters includes creating a control link between the controller and each node of a corresponding cluster.

* * * * *